(12) United States Patent
Stehle et al.

(10) Patent No.: US 7,849,031 B2
(45) Date of Patent: Dec. 7, 2010

(54) OPTIMIZING TRAFFIC PREDICTIONS AND ENHANCING NOTIFICATIONS

(75) Inventors: Tommy Allen Stehle, Kansas City, MO (US); Christopher James Simon, Shawnee, KS (US); Terrence Matthew Palloto, Kansas City, MO (US); Michael Richard Ostrom, Blue Springs, MO (US)

(73) Assignee: HNTB Holdings Ltd., Kansas City, MO (US)

( * ) Notice: Subject to any disclaimer, the term of this patent is extended or adjusted under 35 U.S.C. 154(b) by 660 days.

(21) Appl. No.: 11/766,607

(22) Filed: Jun. 21, 2007

(65) Prior Publication Data

US 2007/0293958 A1 Dec. 20, 2007

Related U.S. Application Data

(63) Continuation-in-part of application No. 11/316,567, filed on Dec. 21, 2005, now Pat. No. 7,511,634, and a continuation-in-part of application No. 11/316,135, filed on Dec. 21, 2005.

(60) Provisional application No. 60/828,949, filed on Oct. 10, 2006, provisional application No. 60/639,060, filed on Dec. 22, 2004, provisional application No. 60/638,739, filed on Dec. 22, 2004.

(51) Int. Cl.
*G06F 15/18* (2006.01)
*G06E 1/00* (2006.01)
*G06E 3/00* (2006.01)
*G06G 7/00* (2006.01)

(52) U.S. Cl. ........................................................ 706/21

(58) Field of Classification Search ..................... 706/21
See application file for complete search history.

(56) References Cited

U.S. PATENT DOCUMENTS

| 6,745,123 | B1 | 6/2004 | Petzold et al. | |
|---|---|---|---|---|
| 7,519,564 | B2 * | 4/2009 | Horvitz | 706/12 |
| 7,522,995 | B2 * | 4/2009 | Nortrup | 701/209 |
| 7,698,055 | B2 * | 4/2010 | Horvitz et al. | 701/117 |

(Continued)

OTHER PUBLICATIONS

Traffic Pattern Prediction and Performance Investigation for Cognitive Radio Systems, Xiukui Li; Zekavat, S.A.; Wireless Communications and Networking Conference, 2008. WCNC 2008. IEEE Digital Object Identifier: 10.1109/WCNC.2008.163 Publication Year: 2008, pp. 894-899.*

(Continued)

*Primary Examiner*—Michael Holmes
(74) *Attorney, Agent, or Firm*—Shook, Hardy & Bacon LLP

(57) ABSTRACT

Travel-demand forecasting methods are described for predicting traffic volume based, at least in part, on user-entered data in the form of origin/destination data pairs, user preferences, demographic data and other types of socioeconomic data. This data can source a prediction algorithm or be used to calibrate or more make accurate a current algorithm. Methods and systems are described for, among other things, optimizing traffic predictions, forecasting traffic patterns using user-assigned trip patterns, associating rich attribute information to navigation routes, exposing personal-logistic information to a group, communicating traffic-situation-generated alerts based on user information, optimizing a presentation of user-defined traffic routes, and presenting location indications based on proximity (temporal or geographical).

19 Claims, 17 Drawing Sheets

U.S. PATENT DOCUMENTS

2007/0276596 A1* 11/2007 Solomon et al. ............ 701/211

OTHER PUBLICATIONS

Trunked radio systems: traffic prediction based on user clusters, Hao Chen; Trajkovic, L.; Wireless Communication Systems, 2004. 1st International Symposium on Digital Object Identifier: 10.1109/ISWCS.2004.1407212 Publication Year: 2004, pp. 76-80.*

Traffic congestion forecasting in WCDMA networks, Kejing Zhang; Cuthbert, L.; Communications and Networking in China, 2008. ChinaCom 2008. Third International Conference on Digital Object Identifier: 10.1109/CHINACOM.2008.4685191 Publication Year: 2008, pp. 992-996.*

An applicable short-term traffic flow forecasting method based on chaotic theory, Jianming Hu; Chunguang Zong; Jingyan Song; Zuo Zhang; Jiangtao Ren; Intelligent Transportation Systems, 2003. Proceedings. 2003 IEEE vol. 1 Publication Year: 2003, pp. 608-613 vol. 1.*

Patent Cooperation Treaty (PCT) International Search Report, Sep. 24, 2008, 8 pps.

* cited by examiner

| ROUTES | ACTUAL/EXPECTED TRAVEL-TIME(MIN) | SPEED (MPH) | VOLUME (CARS PER/HOUR) | OCCUPANCY (% OCCUPIED) |
|---|---|---|---|---|
| SB I-43 TO MARQUETTE INTERCHANGE | NO DATA | 51 | 256 | 2 |
| SB I-43 TO SB I-43/94 | NO DATA | 52 | 336 | 2 |
| EB I-94 TO SB I-43/94 | NO DATA | 55 | 644 | 5 |
| EB I-94 TO EB I-794 | NO DATA | 55 | 846 | 6 |

FIG. 10

OPTIMIZING TRAFFIC PREDICTIONS AND ENHANCING NOTIFICATIONS

CROSS REFERENCE TO RELATED APPLICATIONS

This application, is a Continuation-in-Part of two copending U.S. nonprovisonal applications: the first having Ser. No. 11/316,567, been filed on Dec. 21, 2005, and claiming the benefit of U.S. Provisional Application No. 60/639,060 filed on Dec. 22, 2004; and the second having Ser. No. 11/316,135, been also filed on Dec. 21, 2005, and claiming the benefit of U.S. Provisional Application No. 60/638,739 filed on Dec. 22, 2004—and 2) claims the benefit of U.S. Provisional Application No. 60/828,949, filed Oct. 10, 2006. All of the aforementioned applications are incorporated by reference herein.

SUMMARY

This Summary is generally provided to introduce the reader to one or more select concepts described below in the Detailed Description in a simplified form. This Summary is not intended to identify the invention or even key features, which is the purview of claims below.

One embodiment of the invention includes travel-demand forecasting that predicts traffic volume more accurately by considering user-entered information as well as potentially demographic data, and other socioeconomic data. This data can be used to correlate traffic patterns to users, glean information about other individuals (even if not users), and then draw inferences about those person's traffic patterns to more accurately predict traffic patterns. In addition to the practical application of more accurately predicating traffic patterns, location-based services can also be provided. Illustrative location-based services include providing services associated with a person's entered route (such as indicating coupons for nearby stores). The user-entered data can be used on a massive scale to create a robust, national traffic-prediction model for an entire country. A route of interest and/or location of interest are within the scope of what is generally referred to herein as a "routing scenario."

Systems and methods are also described for presenting dynamic traffic information. A user profile can be stored. For example, the user profile may indicate road segments of interest to a user. Advisory data based on the user profile is gathered. The advisory data may include traffic information associated with the road segments identified by the user profile. Upon receiving a user input, the advisory data is presented to a user.

Various aspects of embodiments of the present invention include optimizing traffic predictions, forecasting traffic patterns using user-assigned trip patterns, associating rich attribute information to navigation routes, exposing personal-logistic information to a group, communicating traffic-situation-generated alerts based on user information, optimizing a presentation of user-defined traffic routes, and presenting location indications based on proximity (temporal or geographical).

BRIEF DESCRIPTION OF THE SEVERAL VIEWS OF THE DRAWING

The present invention is described in detail below with reference to the attached drawing figures, wherein:

FIGS. 8, 9, and 10 are screen displays for presentation in accordance with embodiments of the present invention;

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for distributing and presenting information to a user. An exemplary operating environment for the present invention is described below.

Figure 1:
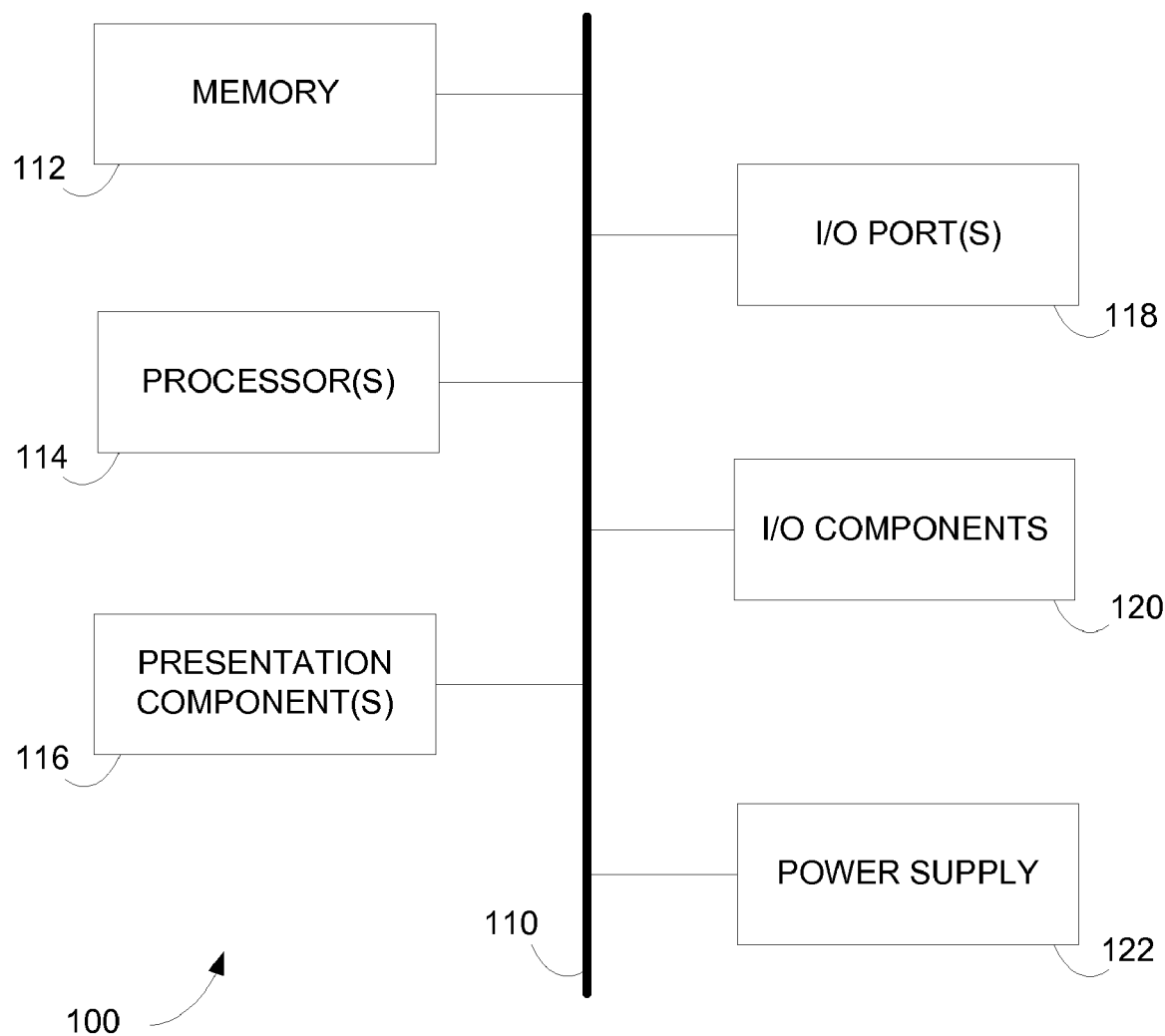
FIG. 1 is a block diagram of a computing system environment suitable for use in implementing the present invention.

Referring initially to FIG. 1 in particular, an exemplary operating environment for implementing the present invention is shown and designated generally as computing device 100. computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following elements: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It should be noted that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As previously mentioned, the present invention includes an improved system for managing and presenting information related to a project. A variety of endeavors may be a "project," as the term is used herein. For example, construction projects are contemplated by the present invention. These construction projects may relate to land site development, roadway or other infrastructure construction, or to the construction of buildings and other structures. The present invention may also be used along with nonconstruction projects. In sum, embodiments of the present invention may be used with any number of architectural, engineering or other projects.

Figure 2:
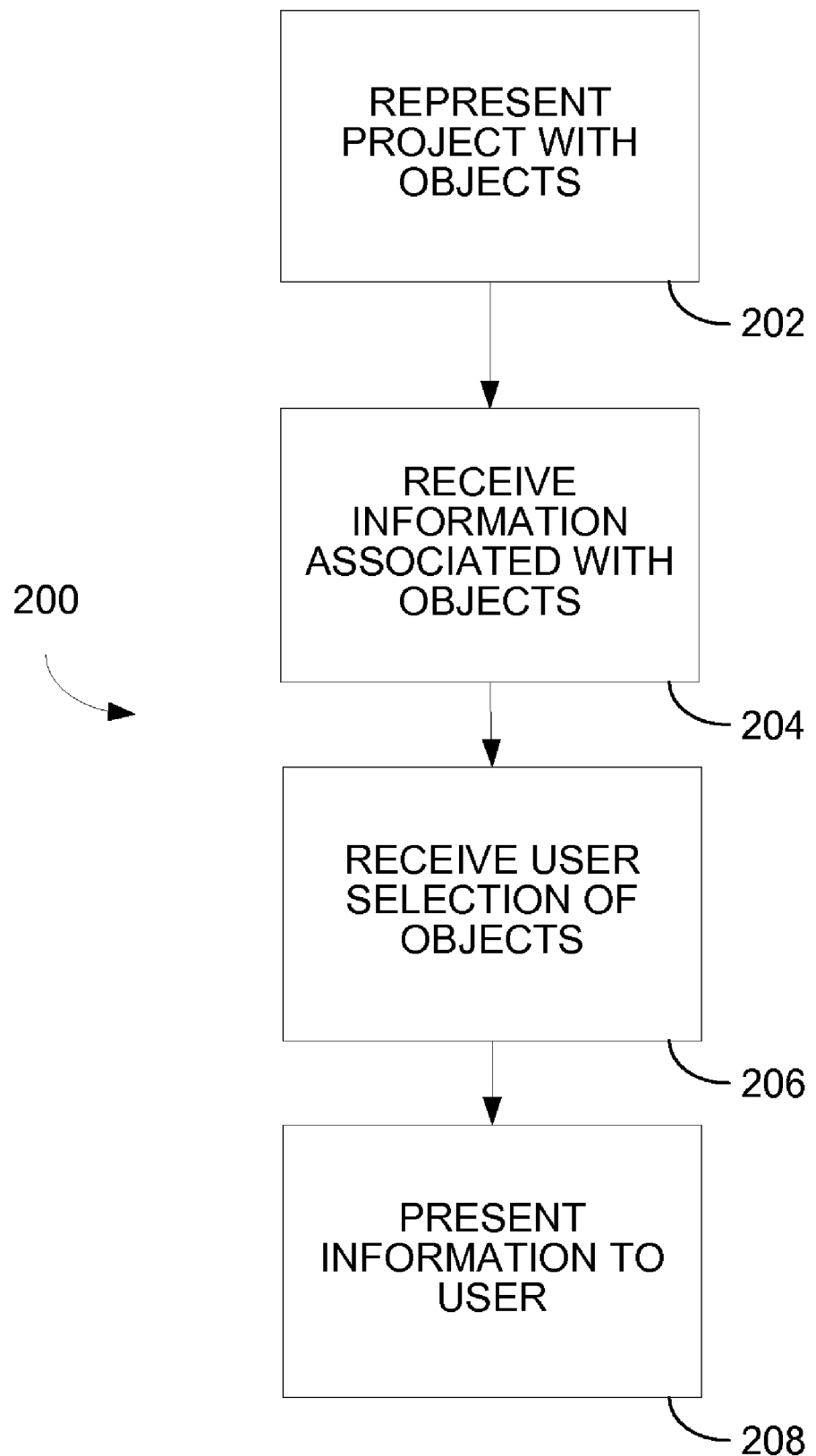
FIG. 2 illustrates a method in accordance with one embodiment of the present invention for presenting project information to a user.

FIG. 2 illustrates a method 200 for presenting project information to a user. At a step 202, the method 200 represents a project with multiple objects. A project may be divided into constituent parts and each of these parts will have a relationship with the other parts and with the project as a whole. For example, the road segments undergoing construction and/or affected by the project can represent a roadway construction project. As another example, a site development project may be represented by the parcels of land within the site. A building project may be described by locations in the structure or by other divisions. As will be appreciated by those skilled in the art, there may be numerous ways to represent a project with objects.

At a step 204, the method 200 receives items of information related to the project. A wide variety of information may be received by the method 200, and the information may originate from many different sources. The information may relate to current conditions in the area affected by the project or may relate to project progress. The information may indicate scheduled project events and may lay out a timeline for the project's completion. The information may also be feedback and comments from stakeholders. In one embodiment, each item of information is associated with at least one of the objects. By associating information with objects, the received information can be intelligently organized. For example, real-time traffic data and scheduled lane closures may be associated with discrete road segments in a roadway construction project. By organizing the data in this manner, the current and future conditions on each of the various road segments may be examined and tracked.

The method 200, at a step 206, receives a user input selecting one of the objects. In one embodiment, the method 200 provides a user interface that includes a graphical representation of the project, as represented by the various objects. By using this interface, the user may select the graphic associated with an object of interest. For example, the user may be a commuter seeking roadway conditions on a particular roadway segment. As a further example, the user may be a project contributor tracking the project progress to ensure that it stays on schedule. Depending on the type of project, there may be numerous users having interest in some portion of the project and desiring the ability to receive project information in an efficient manner.

At a step 208, the method 200 presents information associated with the selected object to the user. Any number of techniques known in the art may be used for this presentation. Further, the presented information may be subject to a variety of content management and data security constraints. In one embodiment, the user is provided an interface to select objects and to view presented information. For example, a map of a site development project may be presented over the Internet. By selecting to view information associated with parcels of land within the site, a project contributor can track development of the various parcels. Those skilled in the art will recognize that any number of interfaces may be used to provide graphical representations of a project and to present information associated with selected segments.

Figure 3:
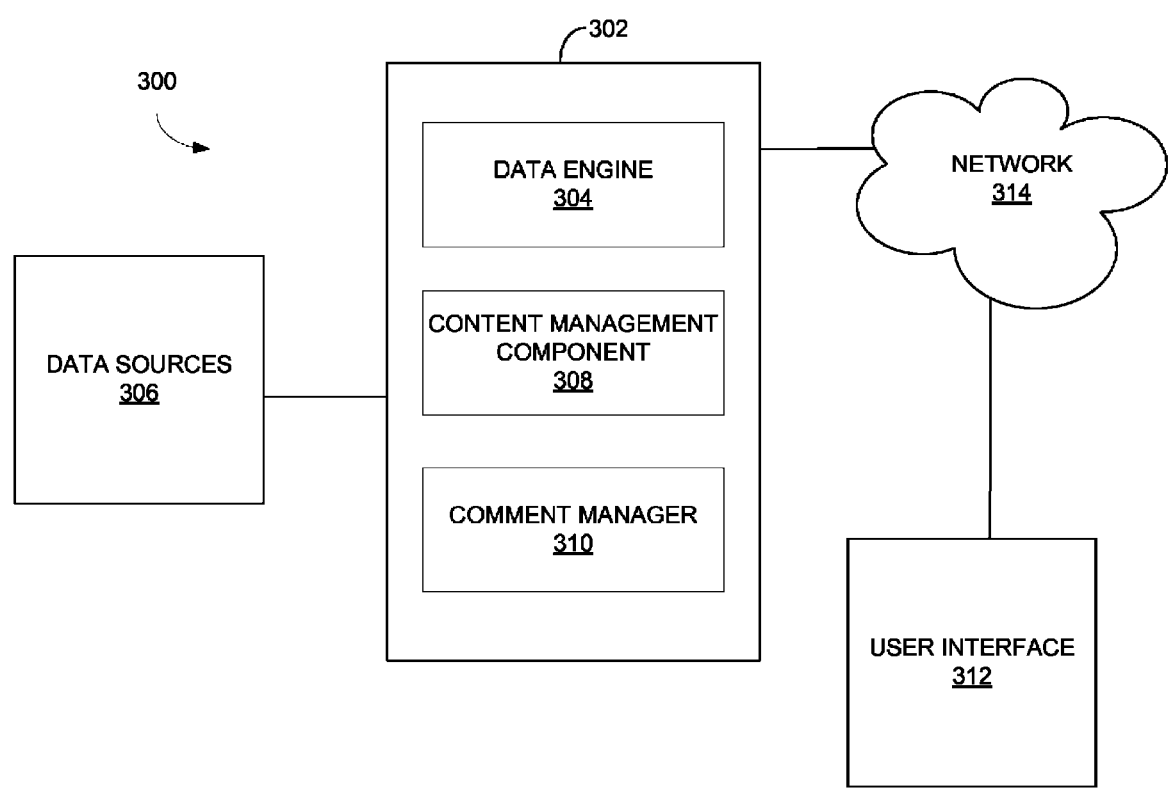
FIG. 3 is a schematic diagram illustrating a system for managing and presenting information related to a project in accordance with one embodiment of the present invention.

FIG. 3 illustrates a system 300 for managing and presenting information related to a project. The system 300 includes a platform 302. In one embodiment, the platform 302 provides integrated data management and messaging utilities designed for converging project information for presentation to users.

The platform 302 includes a data engine 304. The data engine 304 is an application that may be configured to process a variety of data for display within a graphic user interface. The data engine 304 may also provide messaging utilities for subscription-based notification services. The data engine 304 receives information in the form of digital data from data sources 306. As will be appreciated by those skilled in the art, there are many different forms of data that may relate to a project. As an example, consider a roadway construction project. Traffic speed and performance data are gathered from roadway sensors, while video is obtained from traffic cameras. Data, such as incidents, road closures, or construction and detour information, is stored in a database, and computer-assisted dispatch data may be received from law enforcement agencies. Road condition and weather data are transmitted over roadway weather information systems, while text is presented on dynamic message signs. Roadway geometry is stored in CAD systems. In sum, the data sources 306 may provide a variety of data to the data engine 304 related to a project.

In addition to the project data received from the data sources 306, the data engine 304 may receive additional project information. As will be discussed, the platform 302 may be configured to manage and maintain information such as construction schedules and other documents relevant to a project. The data engine 304 may receive this additional project information and may enable its presentation.

The data engine 304 may process the received items of data/information by associating each item with a project object. As previously mentioned, multiple objects may represent a project. By associating data with project objects, the data associated with a segment can be presented to a user on demand. To accomplish this presentation, a user interface 312 may receive information from the platform 302 via a network 314. In one embodiment, the network 314 is the Internet, and the user interface 312 is provided as a web page.

Returning to the roadway construction project example, the user interface 312 may present a traffic map displaying the roads affected by the construction project. Traffic speed ranges on roadway segments may be indicated with colors, while actual speeds are displayed when the user selects a segment. Icons may be positioned within the user interface 312 to indicate available, location-specific data for incidents, traffic cam images, and variable message signs text. Further, the user interface 312 may receive information such as construction phasing, closure schedules and alerts from a content management component 308. Each of these items of information may be associated with a road segment and presented by the user interface 312 upon a user's request.

In one embodiment, the various project objects (e.g., road segments) may be presented by representing the objects with graphical representations (e.g., a traffic map). These representations may be derived from CAD files or similar type files. As a project progresses, these files may also be updated to reflect current originations of the project objects. Accordingly, the graphical representation of the project will accurately depict the current status and location of the project object.

The data engine 304 may distribute information via a variety of different methods. In addition to the user interface 312, the information may be distributed via e-mail; specialized application programs; web sites developed specifically for PDAs, palmtops and other wireless Internet-enabled devices; RSS (Really Simple Syndication) services using XML; or SMS (Short Message System) data for cell phones. The data engine 304 may also distribute information with other forms of public information delivery such as telematics or any applications that include vehicle-based electronic systems, mobile telephony, vehicle tracking and positioning, on-line navigation and information services, and emergency assistance. As will be appreciated by those skilled in the art, the data engine 304, by associating items of information with project objects, can enable the distribution of a wide variety of project information via any number of distribution means.

The platform 302 also includes a content management component 308. The content management component 308 may manage a variety of content such as web site content, documents, and media. The content management component 308 may manage information presented over the Internet, an intranet and/or an extranet. In one embodiment, the content management component 308 is designed to allow complex/modular cross content relationships and sorting. An administrator may establish these relationships with information (e.g., schedules, new items, events, and documents) made modular by the content management component 308.

The content management component 308 may contain a security model allowing administrative controls over content. Administrators may add, modify, and delete authorized users and may maintain user profile data. Administrators may assign incremental access to content administration and security modules across multiple projects.

To manage content, the content management component 308 may include a variety of modules designed to handle types of content or content actions. One exemplary module may be a document assets module. The document assets module may allow remote uploading and organization of electronic document assets. As another exemplary module, an event scheduler module may be utilized to enter schedules of upcoming or past events. Content such as meeting agendas, handouts, photo files, study materials, and other documents may be associated with these events. The content management component 308 may also include a module that handles news releases and a module that handles images. For example the image module may allow the remote upload and organization of electronic image assets (photos, scans, drawings) and may provide set creation for content modularity.

Content modules may be specific to a certain type of project. For a roadway construction project, a traffic information management module may allow manual or automatic entry of traffic alerts or public advisories within an online public presentation. In addition to administering alerts and advisories, the traffic information management module may allow control over construction and closure schedule information that will be provided to the public, stakeholders, or a private audience. As will be appreciated by those skilled in the art, the content management component 308 may provide any number of modules capable of managing a wide variety of content.

The platform 302 further includes a comment manager 310. The comment manager 310 may be utilized for tracking, mining, and managing feedback concerning a project. In one embodiment, the comment manager 310 offers subscriber-based services and provides archived and current message governance for data gathered from an audience. The comment manager 310 may operate as a repository for general public survey/stakeholder and response information, and it may provide tools to handle electronic correspondence and subscriber lists for mailings or online services. The comment manager may utilize the user interface 312 to receive comments and feedback. As the user interface 312 presents project information to interested parties, these parties are likely to have relevant feedback concerning the project.

The comment manager 310 may also include a correspondence manager that opens incoming correspondence from web site comment forms. The correspondence manager may draft and save e-mail responses for review and may send replies. As another example, the comment manager 310 may include a subscription manager that manages subscriber lists and profiles for online, e-mail, regular mail, and other services. The comment manager 310 may utilize keywords or remarks to identify individual comments or groups of comments for later retrieval. A records database may be maintained, and custom utilities may generate and display statistical data on comments received. The comment manager 310 may also be configured to send mass e-mail messages to entire subscriber lists and to conduct general or invitation-only online surveys using web forms or more sophisticated media. Surveys can range from a simple collection of checkboxes, radio buttons, and multiple-choice or yes/no questions to more sophisticated or custom-designed presentations with images, video, narration, or other multimedia elements.

The comment manager 310 may manage a number of subscriber lists. These subscriber lists may be used for any number of services such as traffic alerts, e-mail alerts and personalized e-mail news. In one embodiment, public web site users can manage their subscriber profiles online and unsubscribe to any or all services. Records from a subscriber database can be downloaded as delimited text files for use in mail merges or creating mailing labels.

Figure 4:
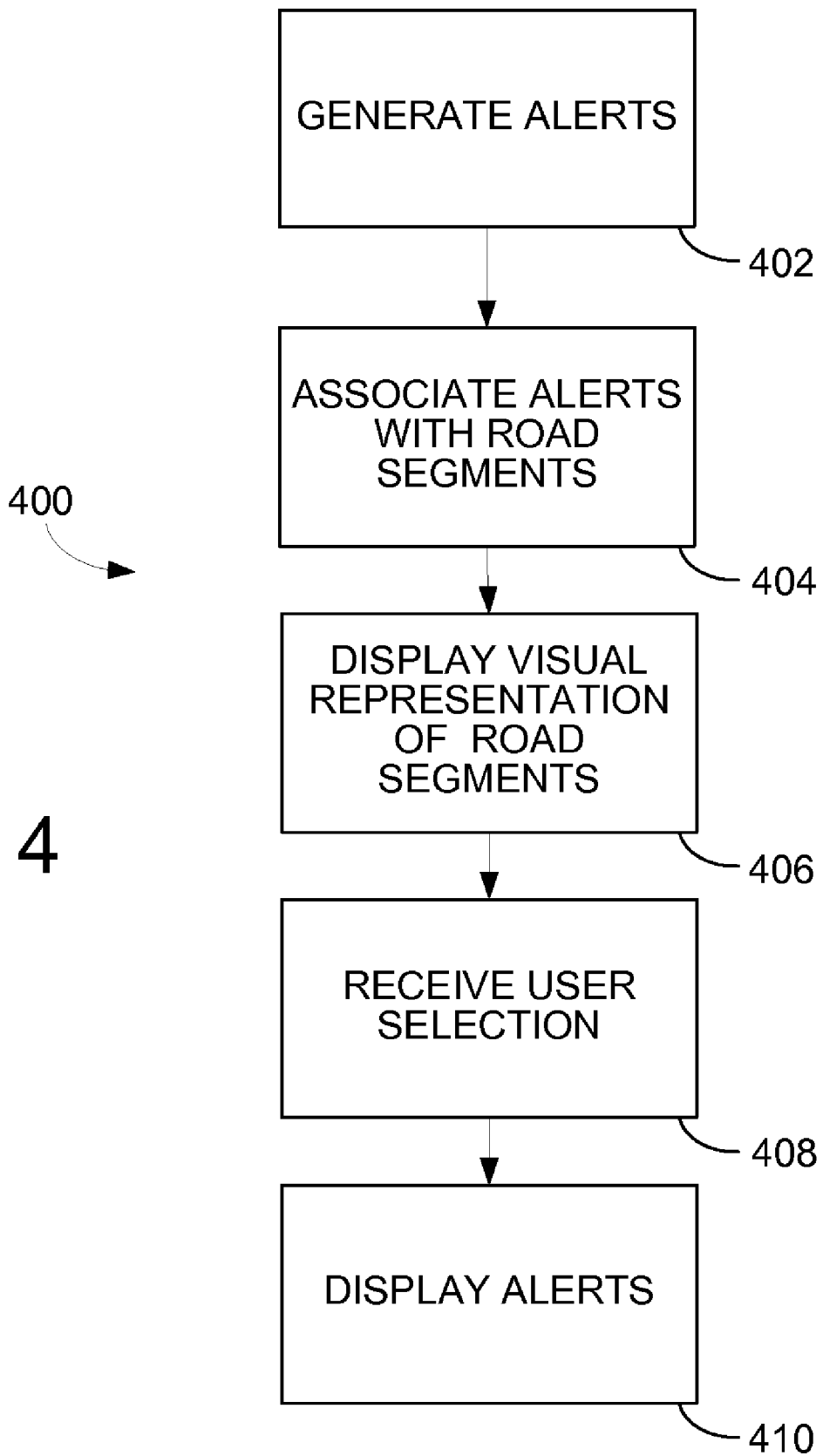
FIG. 4 illustrates a method in accordance with one embodiment of the present invention for distributing traffic information.

FIG. 4 illustrates a method 400 for distributing traffic information. The method 400, at a step 402, generates alerts describing scheduled events anticipated to affect traffic conditions. Any number of events may affect traffic conditions. For example, a construction project may cause traffic delays or dictate that traffic be rerouted/detoured. Popular events, such as concerts or sporting events, may be expected to affect traffic, and, thus, these events may also be the subject of alerts. In one embodiment, the alerts are generated by utilizing a schedule of events. One in possession of this schedule may identify events as expected to affect traffic and as being appropriate for basing an alert.

At a step 404, the method 400 associates the alerts with segments of road. In one embodiment, the method 400 may utilize a computer application such as the data engine 304 of FIG. 3 to associate alerts with the road segments. For example, an alert may indicate that a certain number of lanes will be closed on a highway. This alert may be associated with each road segment affected by the lane closure. Those skilled in the art will appreciate any number of data storage techniques known in the art may be acceptable for storing representations of road segments and for associating alerts with the road segment in a data store.

The method 400, at a step 406, provides a visual representation of the road segments in a user interface. In one embodiment, a traffic map is provided over the Internet as a web page. In other embodiments, the visual representation is provided as text data appropriate to be displayed, for example, on a cellular telephone. The visual representation may reflect the current real-time traffic conditions on the road segments. For example, the roads may be color-coded to reflect the average speed of traffic. The user interface may include navigation controls for the user to view road segments of interest and to zoom in and out on the presentation. Additional controls may also be provided to allow the user to select the type of information that is displayed. For example, the user interface may allow the user to view predicted future occupancy or usage of the roads. Historic traffic data may be used to predict this future use. Similarly, the user interface may allow the user to view how the roads will change as the construction project progresses. As the method 400 may interact with a schedule of events, this schedule may be used to predict the future traffic occupancy/usage and the future placement of the road segments.

At a step 408, the method 400 receives a user input selecting a road segment. Depending on the interface displayed at the step 406, any number of techniques may be utilized to receive the user input. For example, the user may use a mouse to select a segment displayed on a traffic map. Text-based interfaces may also have input methods allowing a user to select a road segment. In one example, the user may select road segments of interest, and these segments may be stored as part of a user profile.

The method 400, at a step 410, displays the alerts associated with the selected road segments. In one embodiment, the alerts are provided in the user interface. As another example, the alerts may be communicated via e-mail or other messaging means. The method 400 may use a user profile to determine which users should receive an alert. As will be appreciated by those skilled in the art, because the alerts are associated with road segments in a data store, the method 400 may access the data store, identify the alerts associated with the selected segment and retrieve these alerts for presentation to a user.

Figure 5:
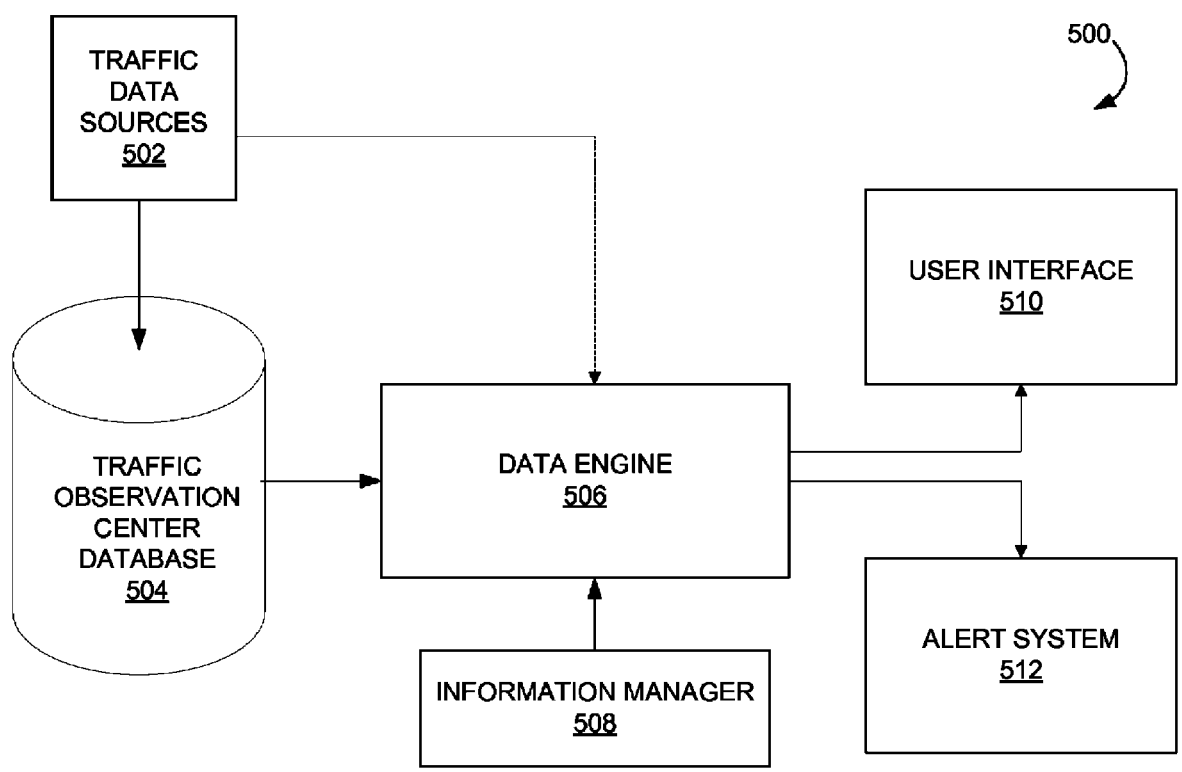
FIG. 5 is a schematic diagram illustrating a system for managing and presenting traffic information in accordance with one embodiment of the present invention.

FIG. 5 illustrates a system 500 for managing and presenting traffic information. It should be noted that, while the system 500 is directed toward traffic information, a wide variety of projects could utilize a system such as the system 500. The system 500 utilizes traffic data gathered from a variety of traffic data sources 502. The traffic data sources 502 may include a variety of different devices. For example, sensors may monitor the speed of traffic, while cameras may capture images and video of the traffic. The traffic data sources 502 may also indicate active incidents and the text displayed on roadway signs.

The system 500 also includes a traffic observation center database 504. The database 504 may receive a portion of the traffic data from the traffic data sources 502. In one embodiment, the traffic observation center database 504 receives a variety of the traffic data and utilizes the data to calculate speed, performance, and estimated travel times on the monitored roads. Those skilled in the art will recognize that a database such as the traffic observation center database 504 may be maintained by a regional transportation authority or may be privately maintained. In either case, the traffic observation center database 504 may be configured to receive and store a wide variety of traffic data and to use the data to describe and report traffic conditions.

A data engine 506 is included in the system 500. The data engine 506 is configured to receive data from the traffic observation center database 504. For example, an application on the traffic observation center database 504 may generate a data stream that is transmitted to the data engine 506. In one embodiment, the data stream has an XML format, and the data stream may be made available to broadcast media and other information providers. In this way, the data stream may have value beyond its use in the system 500. The data engine 506 may also receive data directly from the traffic data sources 502. For example, a video feed from a traffic camera may be transmitted directly to the data engine 506. The data engine 506 may also receive information from an information manager 508. The information manager 508 may store a variety of information relevant to traffic conditions. For example, the information manager 508 may store construction schedules defining road closures and road changes caused by a construction project.

Upon receiving the traffic data, the data engine 506 may be configured to gather, organize, and/or format the data for display on a user interface 510 and for transmission via an alert system 512. For example, the data engine 506 may be configured to associate received data with a section of roadway. As the roadways may be represented with discrete pieces of geometry in the data engine 506, the received data can be organized by relating information with pieces of geometry. Various techniques for such data storage and organization are known in the art. When the user interface 510 requests display of traffic data, the data engine 506 may communicate such information to the user interface 510, organized by roadway segment. Similarly, alerts provided by the alert system 512 may include information related to a roadway segment of interest.

As an example, the traffic data received by the data engine 506 may indicate that lanes on a particular road segment will be closed for a scheduled period of time. In one embodiment, this closure information is received from the information manager 508, and the information includes a beginning date and end date for the closure. The data engine 506 may display the closure information on the user interface 510 along with the display of the affected road segment. The data engine 506 may also enable the alert system 512 to generate alerts notifying subscribers of the closure. The information manager 508 may also provide custom alerts. For example, a festival may affect traffic on a roadway segment. An alert associated with this festival may be communicated to the data engine 506, and the data engine 506 may enable presentation of this custom alert on the user interface 510 and by the alert system 512.

Figure 6:
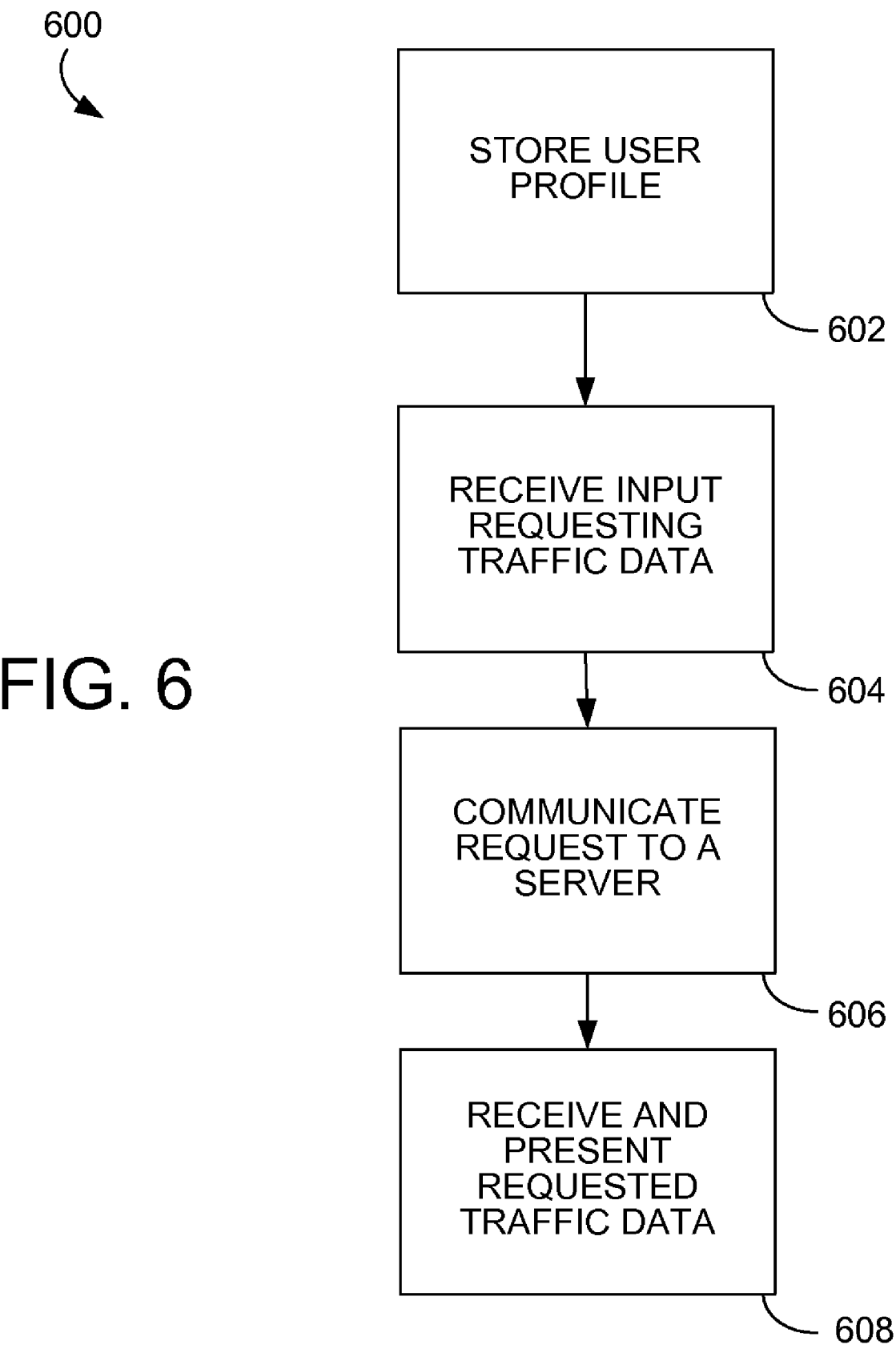
FIG. 6 illustrates a method in accordance with one embodiment of the present invention for presenting dynamic traffic information to a user.

FIG. 6 illustrates a method 600 for presenting dynamic traffic information to a user. At a step 602, the method 600 stores a user profile that includes user settings. A variety of information may be stored in the user's profile. In one embodiment, the method 600 may utilize an application program residing on a user's computer. The application program may include an interface in which a user may indicate road segments of interest. For example, a user may input their route to work. The profile may also indicate the type of information that a user desires to view. A user may specify which alerts they would like to view and/or how often the information should be updated.

The method 600 receives a user input requesting traffic data at a step 604. A wide variety of traffic information may be presented by the method 600. For example, the current speed, volume, and occupancy of roadways may be displayed. Further, incident reports, road closures, and other advisories may be presented. A user input may request this traffic data, and any number of inputs may be received at the step 604.

In response to the user input, at a step 606, the method 600 communicates a request to a server. In one embodiment, an application program may contact the server over the Internet. The server may house the traffic data, and the server may be in communication with a database of traffic information such as the traffic observation center database 504 of FIG. 5. The server may also be in communication with a data engine such as the data engine 506 of FIG. 5. In sum, the server may have access to a broad array of traffic information from multiple sources.

The server may be running a web service configured to receive the request communicated at the step 606. In one embodiment, the request incorporates information from a user's profile. For example, the profile may store routes of interest to a user. In this case, the request may include an indication of these selected routes, as well as the types of information desired by the user. In response to the request, the server may query its data store and identify traffic information responsive to the request. This information may then be communicated to the user's computer.

At a step 608, the method 600 receives and presents the requested traffic information. Any number of presentation techniques may be acceptable for the present invention. For example, the server may communicate the traffic information for display by the application. In one embodiment, the information is presented by the server as a dynamically generated web page. In this way, the user may refresh the traffic data and navigate to additional information of interest in the context of an Internet browser. The dynamic generation of a web page in response to a user request is well known in the art.

Figure 7:
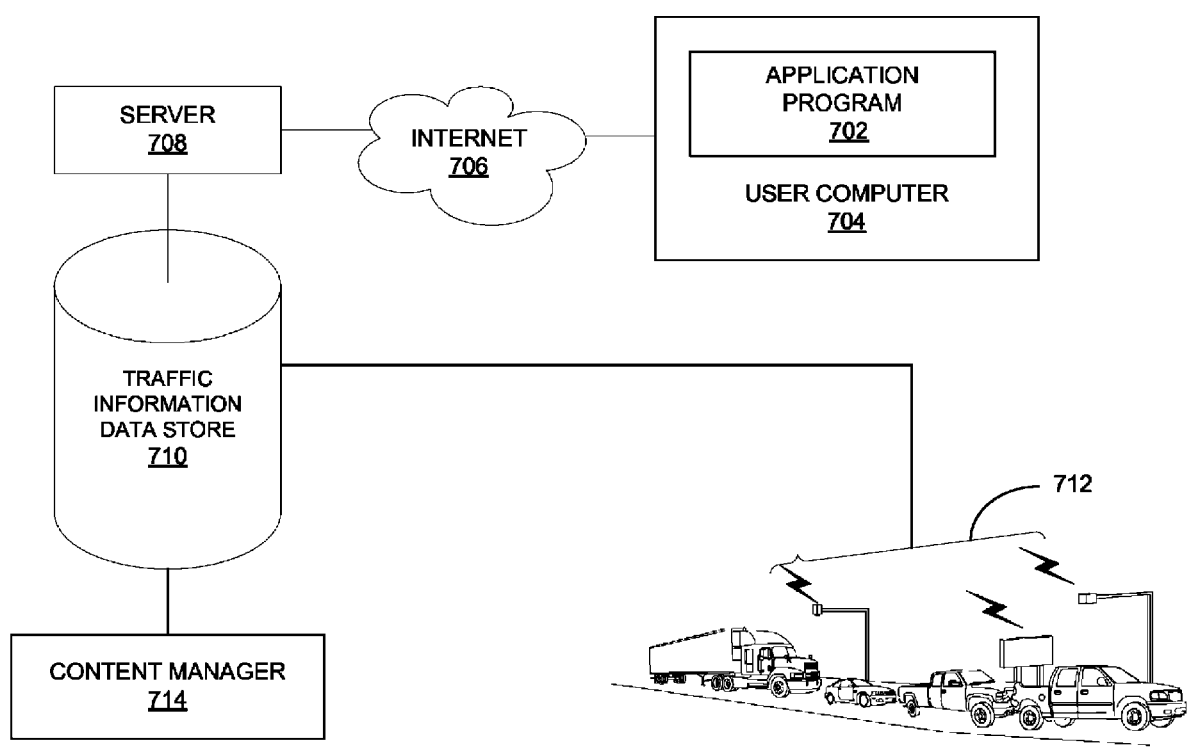
FIG. 7 is a schematic diagram illustrating a system for distributing roadway traffic information in accordance with one embodiment of the present invention.

FIG. 7 illustrates a system 700 for distributing roadway traffic information. The system 700 includes an application program 702. The application program 702 may reside on a user computer 704. The application program 702 may store a user's profile that identifies road segments of interest to a user. The profile may also indicate the types of alerts a user desires. For example, the user may choose to receive traveler alerts, performance information, and/or closure information. Further, the application program 702 may provide any number of interfaces for presenting traffic information.

The application program 702 may be configured to access traffic information over a network, such as the Internet 706. Via the Internet 706, the application program 702 may interact with a server 708 to obtain traffic information. The server 708 may have access to a wide variety of information relevant to traffic conditions. For example, the server 708 may be in communication with a traffic information data store 710. The data store 710 may store a wide variety of traffic information from a variety of sources. In one embodiment, the data store 710 includes a relational database in which items of traffic information are associated with segments of roadway.

To gather traffic information, roadside devices 712 may collect information such as traffic speed, digital images/video, and text from road signs and may communicate this information to the data store 710. The information from the roadside devices 712 may be used to calculate other measures of traffic performance such as traffic volume and the occupancy percent of the roads. These measures may also be stored in the data store 710. The data store 710 may also receive information relevant to traffic conditions from a content manager 714. The content manager 714 may save information such as construction and lane closure schedules. The content manager 714 may also communicate customized alerts to the data store 710.

The application program 702 may communicate a request for traffic data to the server 708. Embedded in the request may be an indication of routes of interest, as indicated by a user's profile. The request may also indicate the type of information desired by the user. Responsive to this request, the server 708 may query the data store 710 for the requested information and may return relevant data to the application program 702. In one embodiment, the application program 702 may receive traffic data from the server 708 when the program 702 is launched. Subsequently, the application program 702 recurrently communicates with the server 708 to determine changes to the traffic information. For example, the application program 702 may check for updated information every 10 minutes. If new information exists, the application program 702 may notify the user of the updated information. In one embodiment, the application program 702 displays an icon on the user's screen, and, when a new update is detected, the icon flashes and changes color.

When a user indicates a desire to view traffic information, the application program 702 communications a request to the server 708 and receives the traffic information. Any number of interfaces may be acceptable for presentation of the traffic information. In one embodiment, the server 708 may return the requested information as a web page, and the application program 702 may enable presentation of the web page. For example, the server 708 may dynamically generate the web page upon receiving the request from the application program 702. Techniques for such dynamic generation and presentation of web pages are well known in the art.

Figure 8:
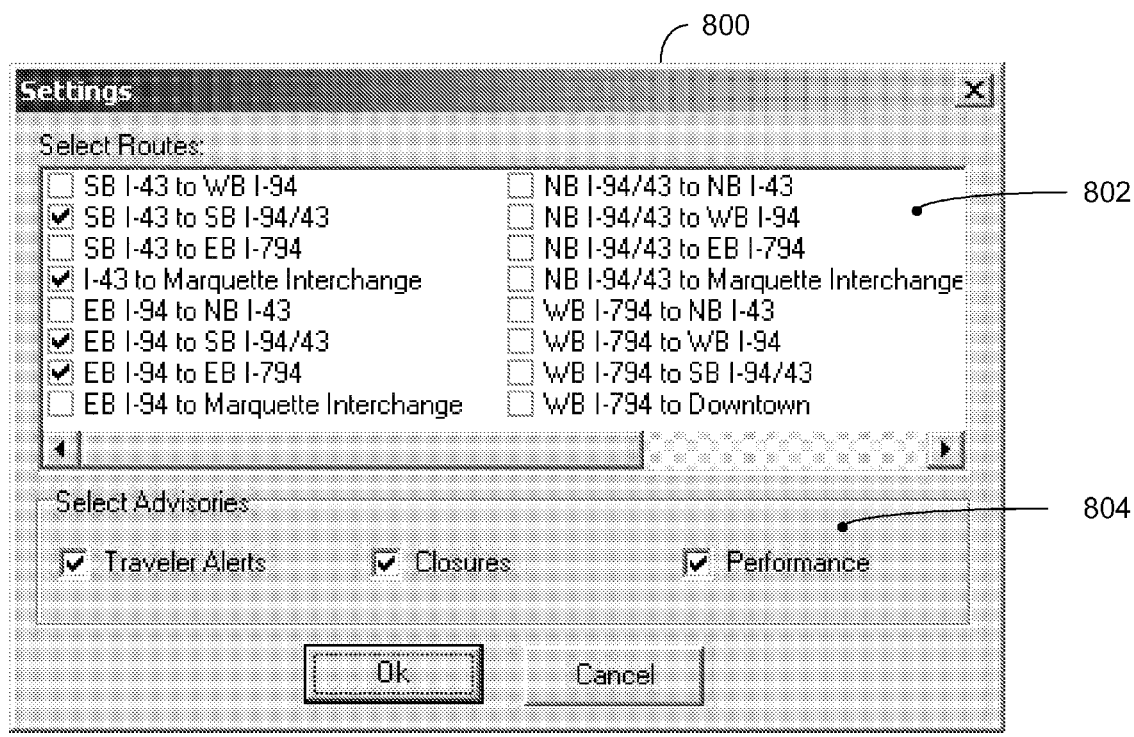
Figure 9:
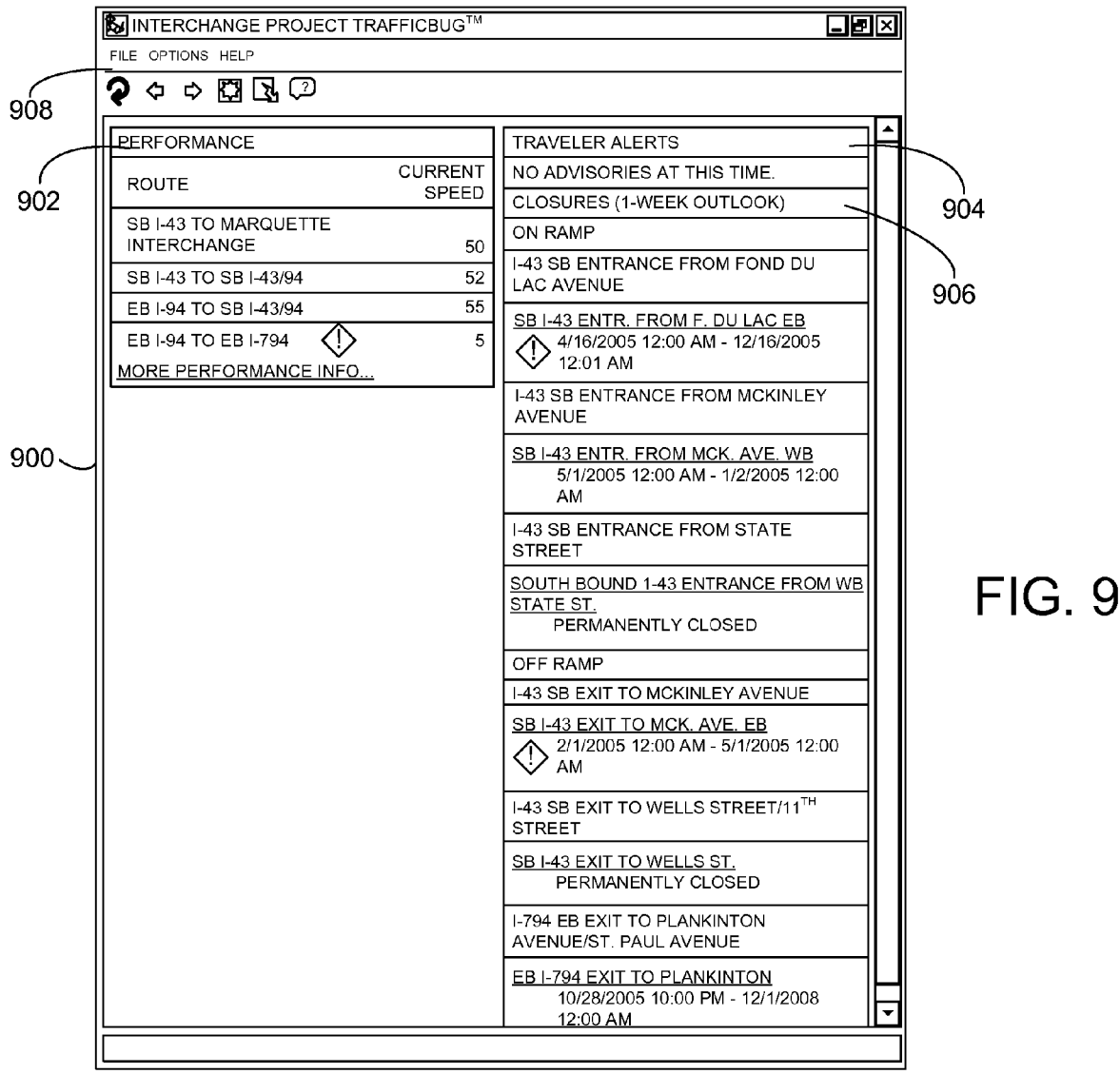

FIGS. 8, 9, and 10 illustrate screen displays for presentation to a user in accordance with an embodiment of the present invention. FIG. 8 illustrates a screen display 800 that allows a user to input information relevant to the user's profile. Using the screen display 800, the user may create a profile for use with a system such as the system 700 of FIG. 7. The screen display 800 includes a route selection area 802. The route selection area 802 lists segments of roadway (i.e., routes) that the user may have an interest in obtaining traffic information. The user may select a particular route by clicking a user-selectable check box. For example, a user may select each road segment upon which he commonly travels.

The screen display 800 also includes an advisory selection area 804. In one embodiment, three types of advisory data are available: performance, traveler alerts, and closures. Performance advisory data show current traffic speeds for single or dual-segment travel route definitions. Actual speeds may be shown for single segment routes, while average speeds are shown for dual-segment routes. Traveler alerts may be entered manually by a project team and may describe unscheduled spot-closures or unanticipated situations that may affect traffic flow for extended periods. Traveler alerts may also include crash or other real-time incident information. The closures advisory data display information such as scheduled off-ramp, on-ramp, local street, or mainline closures. For example, the closures listed may be those that will begin or be in progress during the next seven-day period. In one embodiment, records are displayed from a closure database, which is programmed long-term with long-term closure schedule and adjusted short-term as needed.

Turning to FIG. 9, a screen display 900 is presented, and the screen display 900 may display desired traffic information. As previously discussed, a request for traffic information may be transmitted to a server over the Internet, and the server may communicate information responsive to this request. To display the received information, the screen display 900 may be utilized. The screen display 900 includes a performance display area 902 in which performance advisory data is presented. For example, the performance display area 902 may present the current speed of traffic on the routes indicated by a user's profile. In one embodiment, if the speed of a segment falls below a predetermined threshold (e.g., 20 miles per hour), the performance display area 902 presents an icon alert with the route. For example, the route "EB I-94 to EB I-794" includes an icon alert because the current speed is only 5 miles per hour.

The screen display 900 also includes a traveler alert display area 904 and a closures display area 906. A variety of information may be displayed in the areas 904 and 906, and the presented information may vary based on the user's profile. Also, icon alerts may indicate important or newly added advisories. Finally, the screen display 900 includes a toolbar 908 having a number of user-selectable tools. For example, the toolbar 908 may allow the user to update (refresh) the information presented on the display areas 902, 904, and 906. The toolbar 908 may also allow the user to alter profile settings and to specify routes and advisories of interest. In sum, any number of tools may be provided by the toolbar 908.

The screen display 900 may also provide links to additional information. For example, the performance display area 902 includes an option to view "More performance info . . . " FIG. 10 presents an exemplary screen display 1000 that provides such supplemental performance information. The screen display 1000 presents a performance display area 1002. The performance display area 1002 includes "Actual/Expected Travel-Time (Min.)," which shows the amount of time to travel through the segment(s) named verses the typical travel time in off-peak traffic periods. The display area 1002 also includes the current traffic speed and the volume of traffic on the roadway segment, expressed in cars per hour. An occupancy measure is also included. One hundred percent occupancy describes a roadway completely occupied by vehicles (i.e., bumper to bumper) traveling at the posted speed limit. It should be noted that FIGS. 8, 9, and 10 illustrate merely exemplary screen displays, and the present invention is not limited to any one type of screen display, interface, or platform.

Figure 11:
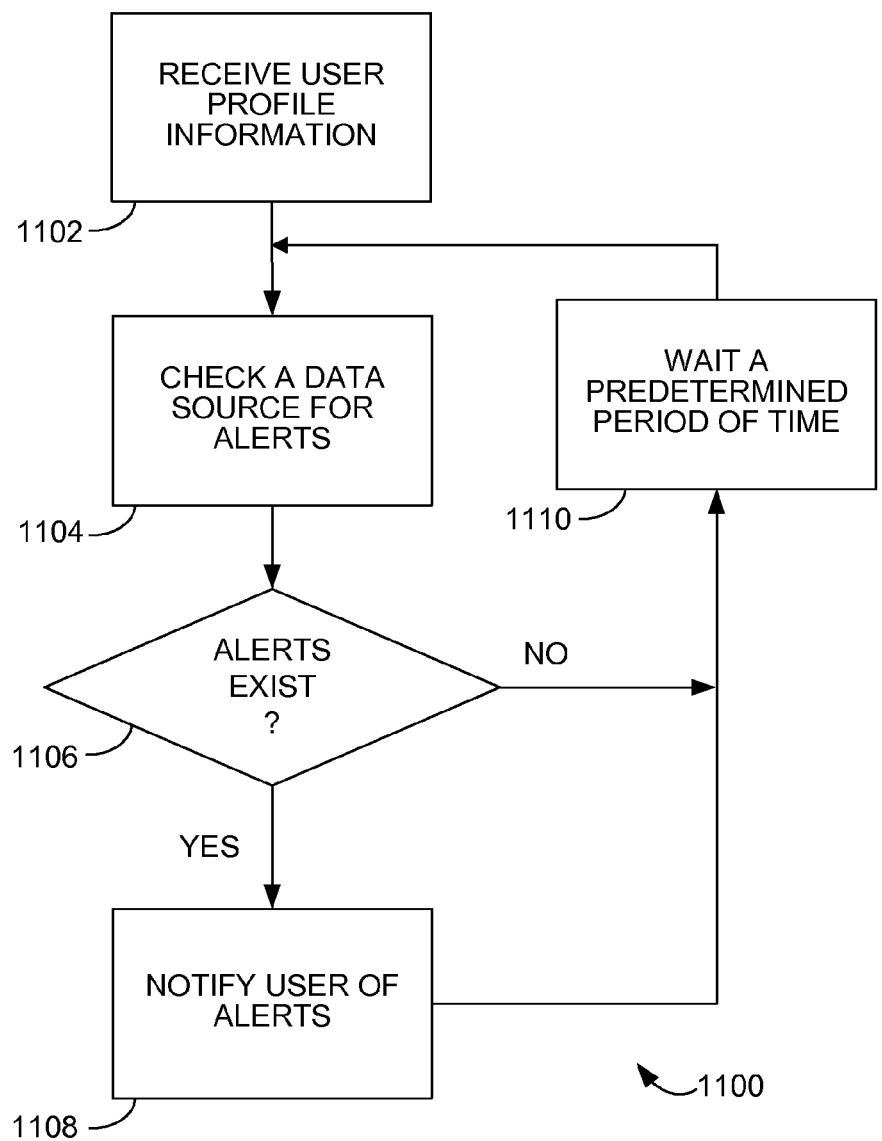
FIG. 11 illustrates a method in accordance with one embodiment of the present invention for distributing traffic information to a user.

FIG. 11 illustrates a method 1100 for distributing traffic information to a user. At a step 1102, the method 1100 receives user profile information. A variety of information may be stored as user profile information. For example, the information may indicate road segments of interest and/or the type of information that a user desires to view.

At a step 1104, the method 1100 checks a data source for traffic alerts that may be of interest to a user. In one embodiment, the data source may be accessible over the Internet and may store a wide variety of traffic data. Utilizing the user profile information, the method 1100 may determine road segments of interest to a user and may contact the data source to obtain traffic information associated with these road segments. The data source may store alerts that indicate any number of different conditions affecting traffic. For example, alerts may relate to road closures or construction schedules. Alerts may indicate sporting or other events that may lead to heavier than expected traffic. Further, accidents and unusually slow traffic conditions may trigger alerts.

The method 1100 determines whether alerts exist for road segments of interest at a step 1106. When such alerts do exist, the method 1100 notifies the user at a step 1108. A variety of notification techniques may be utilized by the method 1100. For example, a message window may appear on the user's screen. As another example, an icon associated with a traffic information application may change color and blink in response to a new alert.

At a step 1110, the method 1100 waits a predetermined period of time before re-checking the data source for alerts. For example, the method 1100 may wait 10 minutes before re-establishing communication with the data source and checking for updated information and alerts. As will be appreciated by those skilled in the art, applications commonly wait a predetermined period of time when monitoring for changes to information or for new messages. By recurrently communicating with the data source once every time period, the method 1100 may keep the user up-to-date as to the current traffic condition on road segments of interest.

Traffic modeling and prediction has historically been plagued by inaccurate data at a variety of levels. For example, the predictions themselves may be inaccurate, but it may also be the case that actual traffic patterns may not be the best indicator of future traffic patterns for a variety of reasons. Consider a situation where traffic data is gathered in real time, stored, and such data is then used to predict future traffic patterns. Assume that metering devices and the like monitor traffic patterns of a given pathway Monday through Friday between the hours of 7:00 a.m. and 9:00 a.m. If a model was called upon to predict traffic on the following day, Saturday, then such a prediction would be inaccurate because Saturday would be free from the rush-hour traffic that occurred during the week. Basing traffic predictions on real-time data is intuitive, but we have thought of a way to further increase the accuracy of a traffic-prediction model, which has several practical applications in the technical arts, including, among many other things, conserving natural resources by reducing traffic jams by allowing people to more accurately plan their routes.

The accuracy of a traffic-prediction system relies on the accuracy of data inputted into a model. If accurate data can be used to source a prediction algorithm, then an accurate traffic model that predicts future traffic patterns can be developed.

An issue that has historically plagued the art is gathering vast amounts of source data that can be used as an input to a prediction model. One aspect of our solution is to utilize a distributed-computing environment to present an application that many (thousands or even millions of) users can use to enter desired origins and desired destinations so that such data can be retrieved and used as input or supplementary input into a traffic-prediction model to increase the accuracy of such a model.

This is not an overly intuitive solution because it would involve gathering a fair amount of traffic-route information from users, which can be very costly to do. But even though such a hurdle exists, Applicant believes it is a worthy endeavor, even if conventional wisdom may urge full attention to optimizing a traffic-prediction model by better using or gathering more real-time traffic data. There is a persistent, and now, long-felt need to further increase the accuracy of a traffic-prediction model. While some skilled artisans may recognize the benefits of achieving that goal, we disclose and claim how to achieve it.

Figure 12:
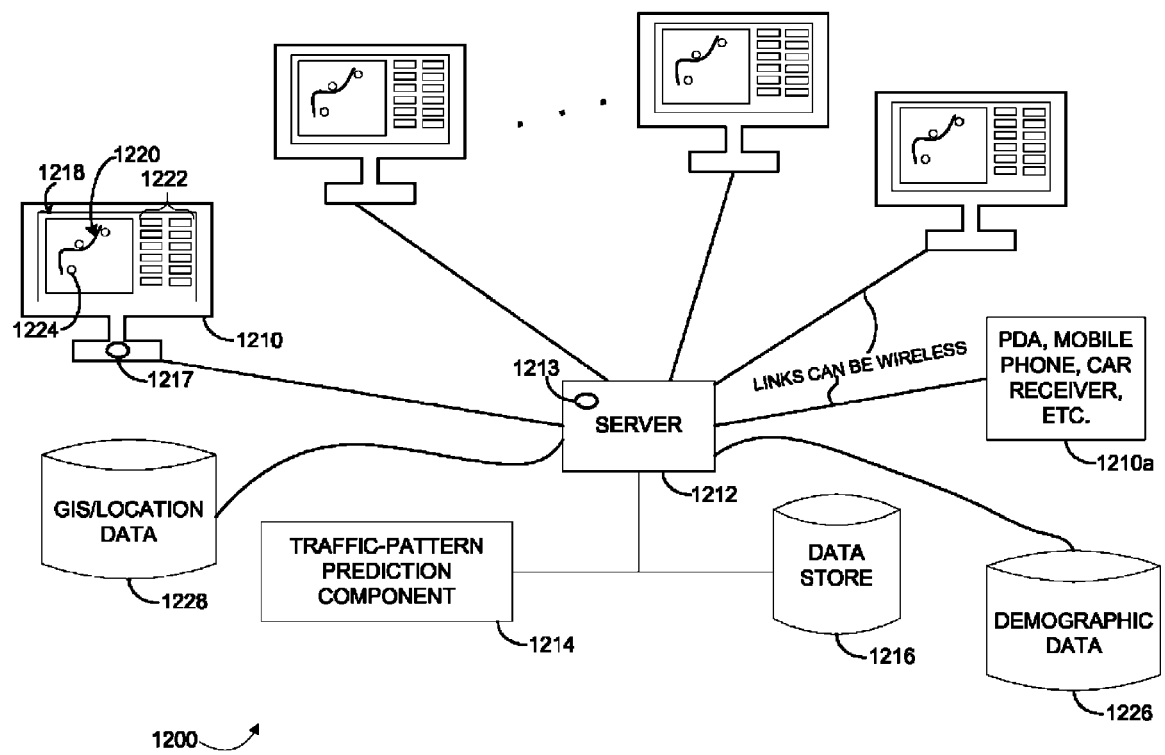
FIG. 12 depicts an illustrative operative environment for receiving user-entered data according to an embodiment of the present invention.

An illustrative operating environment 1200 suitable for practicing an embodiment of the present invention is provided in FIG. 12. A vast number of client devices 1210 are communicatively coupled to a server (or other processing device) 1212 that receives or retrieves information entered at the client devices 1210. Server 1212 is coupled to a traffic-pattern prediction/forecasting component 1214 and also to data store 1216, which stores information used to provide forecasts.

In one embodiment, a client device 1210 runs a client-side application 1217 that presents a user interface 1218 that depicts a customizable route 1220 and receives user input by way of a variety of input fields/controls 1222, which user input is stored in data store 1216 in one embodiment (either directly or retrieved). Various places of interest 1224 can be shown. In another embodiment, user interface 1218, etc., is presented by way of a sever-side application 1213.

Thus, in one embodiment of the invention, an application 1217 similar to the software application described above (but with additional features that will be described below) can be distributed to a wide array of individuals and utilized to receive user-inputted information related to individual traffic patterns, routes, desires, etc. Often, the type of data that will be entered will take the form of origin/destination or "OD" data pairs.

In one embodiment, user interface 1218 includes a variety of fields 1222 that can be populated by a user to receive various types of information associated with the user or another individual relating to traffic patterns. A first illustrative field includes an origin field (not labeled as such because the number of different types are legion). This origin field can be used to denote a starting place associated with a desired route (as opposed to providing merely a predetermined route). A second illustrative field includes a destination field, which can be used to denote a destination associated with the origin.

Other illustrative fields include fields that can receive information such as demographic data, such as socioeconomic data. Illustrative examples include data relating to the type of home that a person lives in, the location of a person's home, and income level of an individual or family, a net worth, a residence valuation, an amount of debt owed, a mortgage amount, a type of automobile driven, an indication of a number of dependents, and the like. In an alternative embodiment of the invention, such socioeconomic or demographic data 1226 can be retrieved from an alternative source where the data is presorted as opposed to being user-entered.

In one embodiment, a user grants access by providing security credentials so that such data 1226 can be gathered and later used to correlate people to traffic patterns and have such data also be used as inputs to a traffic-prediction algorithm. This will be explained in greater detail below.

In one embodiment of the present invention, a user enters an origin and a destination so that a first route (e.g., 1224) is returned to the user. The user may then customize the offered route 1224 according to his or her desires. For example, it may be the case that a person does not wish to take a certain leg of the originally offered route. In such a situation, a user can indicate an alternative route. In this way, the user is indicating a traffic pattern that he or she follows. This data will be captured in an embodiment of the present invention and further used to enhance the accuracy of predicting traffic patterns in the future.

As opposed to merely relying on an origination and a destination to possibly predict future travel, an embodiment of the present invention allows a user to customize routes and indicate other preferences. Illustrative other preferences may include a travel time, such as a start time, or day of week. For example, fields may be presented to a user that allows him or her to indicate that a certain customized route is to be taken starting at 8:30 a.m. If other users enter such information, the forecasted traffic pattern can include such information in making a prediction as to an amount of time that will be associated with the user reaching the destination. Thus, rather than everyone receiving the same indication as to an amount of time that it may take to travel from a given origin to a given destination, such as is the case with current products such as MapQuest®, Google® Maps, Yahoo!® Directions, and the like, indications can be customized.

Moreover, traffic predictions may vary from day to day. Consider the situation where a person works part time, and enters data indicating the same. Thus, data would be entered that would indicate a starting time associated with departing from the origin and also a second starting time associated with departing from the destination back to the origin. This data can further be used to increase the accuracy of forecasting future traffic patterns because it will not be assumed that the originally entered path will be followed during the evening rush hour.

As previously mentioned, demographic data 1226 associated with users is solicited in an embodiment of the invention or retrieved in an alternative embodiment of the invention. This demographic data can then be used to predict traffic patterns of other individuals. Moreover, correlations between demographic data of a person and traffic patterns of a person can be used to predict traffic patterns of other individuals having similar demographics.

For example, it may be the case that a person who makes $50,000 a year and lives a certain distance away from downtown and living in a certain geographic location tends to modify an offered route according to a certain way. This data can be used to extrapolate a traffic pattern even if only the demographic data of other individuals is known. For example, census data or other data may be used to determine how many people having similar demographic profiles also live within a certain range of the first individual and who also work downtown. Thus, it can be surmised that at least a certain percentage of people will also modify their otherwise default driving route in accordance with the way that the known individual modified his or her driving route. This data can be used to more accurately predict a traffic pattern along a certain route, including the original driver's modified driving route. Such information is stored, in one embodiment of the present invention. This too is a departure from conventional practices. Historically, many traffic-instruction providers do not store OD data pairs. But we see benefit in so doing.

As mentioned, an issue associated with gathering enough OD data pairs to independently create a traffic model or supplement a current traffic model exist, which is one reason why some artisans would be motivated to not employ such a scheme. But if consumers can be presented with an application 1217 (which works along or in connection with application 1213) that can add value to them, then they will be more likely to provide such information, which can then be used to further enhance the accuracy of a product. Thus an embodiment of the present invention includes distributing a client-side application 1217 on hundreds of thousands or millions of PCs or other communications devices such as mobile phones or PDAs 1210*a* that will provide various types of information (which can include the type of information previously described), and be used to expose fields, field settings, and additional controls that are used to retrieve user-entered data.

Utilizing user-entered data is a feature that an embodiment includes rather than relying on non-user-entered data, such as real-time data gathered by traffic sensors. Thus, in an embodiment of the invention, a client component 1217 receives indications of origins and destinations associated with a trip. A server component 1212 in communication with the client application 1217 receives and facilitates storing of the origin and destination pairs. In this way, a traffic-prediction component utilizes the origins and destinations to forecast traffic based at least in part on the origins and destinations. In addition, it can utilize the aforementioned demographic data to correlate traffic patterns to users and to then further refine the data prediction model.

An embodiment of the present invention offers a way to provide traffic prediction on a national scale. That is, traffic predictions of an entire country, such as the United States, can be gleaned by utilizing the data associated with stored, user-entered OD data pairs from a set of users. The more data that a user enters, the more accurate and reliable the traffic-prediction model can be. In addition to fields that receive a predetermined or anticipated value, textboxes can also be provided to receive user comments that can be utilized to enhance traffic prediction. For example, a textbox may solicit indications of traffic variance patterns and the like. A user may enter that he or she drives a hybrid or electric vehicle. This data can then be further used to supplement the traffic-prediction model in various ways.

In an illustrative embodiment, the invention has access to geographic information system (GIS) and business data 1228 and can be utilized to determine such things as the number of gas stations and their locations along a prescribed route. If a person is driving a hybrid or electric vehicle, and requires stopping at such gas stations approximately half or 40% of the time that a user who drives a nonhybrid vehicle does, then such data can be utilized by the traffic-prediction component to further increase the accuracy of its results.

A user will be able to customize a route down to a low level of granularity. That is, routes may be specifically described down to specific segments as programmed. Moreover, a user may indicate preferred shopping patterns or other types of patterns associated with driving characteristics. For example, a user may indicate that he or she stops at a specific grocery store during a certain day of the week each week during a specified time. Such data can further be used to increase the accuracy of traffic pattern forecasts. Of course, as previously mentioned, those users who share demographic traits similar to the individual who actually entered such information as shopping patterns can be used to further extrapolate or infer that at least a portion of other individuals might share the same patterns. This data may also be used as a factor by the traffic-prediction component.

Armed with actual, user-entered data, predictions and extrapolations can be made by a traffic-prediction component. This data can be married with or supplement actual traffic patterns to provide more accurate data. For example, it may be the case that construction along a certain pathway has skewed the otherwise actual, or would be, result but for the construction. For example, if a certain segment of highway or traffic way is currently under construction or having work done on it, then traffic may be routed across paths to accommodate for the same. In such a situation, real-time traffic measuring components might be sending an erroneous prediction that such traffic patterns will be followed after construction stops.

But an embodiment of the current invention would have access to origin/destination data pairs by a variety of users, and thereby know that their preferred paths include the paths upon which construction is actually being performed. This data, possibly along with the real-time traffic data, can be used to actually infer that something such as construction is being performed. For example, the traffic-prediction component would be programmed to know or to learn what a certain traffic pattern should be for a certain pathway, but then receive real-time information that indicates that such assumption is wrong, and thereby draw an inference that some real-world issue is causing the disparity.

Armed with this data, an embodiment of the present invention can add value on a variety of fronts. In a first illustrative example, the present invention may be able to assimilate the user-entered data 1216 along with the real-time data (which may also be stored in data store 1216 or combined in real time) to quickly and accurately forecast new predictions associated with the alternative routes that various individuals may take based on the information stored by users. In a second illustrative scenario, as soon as construction stops, the data prediction component will be able to immediately and accurately predict current traffic patterns based on the stored OD data pairs. In contract, a real-time traffic model that utilizes only historical results, would only slowly, over time, have its results comport with reality as it attempts to reconcile new real-time traffic data with old (and disparate) historical traffic data. In this way, a more accurate traffic prediction forecast can be provided and presented to a user.

Another aspect of an embodiment of the present invention allows users to assign trips to a traffic-prediction network, and thereby facilitate the forecasting of traffic patterns using user-assigned trip patterns. Thus, instead of relying on suggestions offered by a computer algorithm only, entries that have been made by users can be used to recommend additional routes or different routes to different users. In operation, a user may provide a desired origin and destination to the system. The system will then provide a suggested route based on the user-received origin and destination. But the system will also allow a user to customize that route. By way of example, the suggested route may suggest that a user take one of three bridges to travel from a first side of a river to another side of a river. But the user may wish to indicate that a specific bridge always be taken. Incident to receiving this data, the system may automatically suggest a new route or receive additional information that further specifies a desired route. One example of further information that more particularly specifies a desired route includes a more granular or lower level specification of a certain route. An embodiment of the present invention allows a user to particularly define a specific segment of a route to take. If, for example, a user often likes to travel past a certain gas station, then the user may indicate that a specific segment of a route be taken.

An embodiment of the present invention allows a user to define a segment, which defined segment can then become part of the system and subsequently used in proposing suggested routes to other users who may request similar routes related to corresponding origins and destinations, or different origins and destinations. Server 1212, by way of application 1213 for example, is equipped with intelligence that can place a higher priority on a user-defined segment than segments that would otherwise be suggested merely by statistical means. A way to think about this is to draw a comparison to contract law. In contract law, sometimes the formatting of terms matters. In forms, manually typed in terms are given more deference than the normal form language, and hand-written terms are given still more weight. Here, if a user took the time to specifically designate a segment of a route, then that user may know something that the system does not. And in one embodiment, when an otherwise similarly suggested route would have been provided, a route that includes the user-defined segment can be provided as an alternative to the default route.

The aspect of allowing users to designate segments of a route, and then allowing the system to define a route based on the user's designation, is a novel aspect of an embodiment of the invention. Moreover, user-provided movement information can be considered as a factor when providing routing information as previously described. This aspect of considering specifically entered movement information as a factor when providing routing information is also a novel aspect of the invention. One may think that system-provided routes should not be modified. This is because the system-provided routes are usually based on the shortest time or the shortest distance, thereby assuming that either or both of those metrics is most important to a user. But applicant recognizes, against such an assumption, that some users may wish to allocate a higher priority to other factors such as including a specific portion of a route to be included in a suggested route. In this way, the system allows for the providing of routing information based on user-provided movement information.

The more users that provide custom-defined segments of routes, the more the system can adapt its suggested routes in the future. For example, if several users specifically designate a segment or portion of a route as a desired segment, then this can further reinforce the likelihood that such a specific designation will be incorporated into future recommendations of routes to users who have not provided such a specific indication. In an alternative embodiment, the present invention may provide by default the shortest distance or shortest time route, but pose an alternative or otherwise make a suggestion of the alternative route. In some other embodiments, a textbox or other control can be provided to a user who modifies a route to include a specific segment to receive comments as to why the modification is being selected. Those comments can then in turn be used to seed comments that the system offers in connection with suggesting an alternative route. For example, a user may tweak a system-provided route to include a certain segment, and in so doing, also provide a note that indicates "construction for the next month." Then, when another user requests similar routing information, either that actual route could be provided, or the default route could be provided along with a suggestion and a note that indicates that this alternative route may be desirable due to construction associated with the corresponding segment of the default route.

Figure 13:
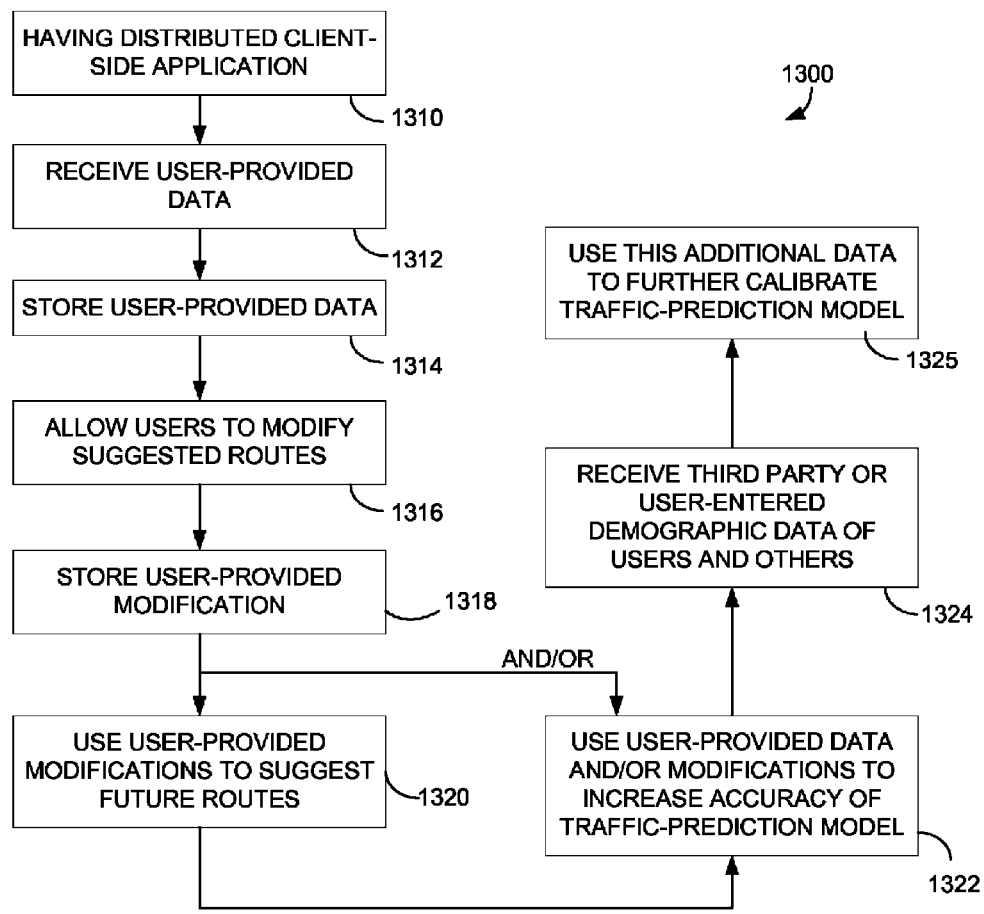
FIG. 13 depicts an illustrative method for facilitating user assignment of sections of a route as well as increasing the accuracy of a traffic-prediction model according to an embodiment of the present invention.

Turning now to FIG. 13, an illustrative method for facilitating user assignment of sections of a route as well as increasing the accuracy of a traffic-prediction model is provided according to an embodiment of the present invention and referenced generally by the numeral 1300. A step 1310 represents a preprocessing step of having distributed a client-side application to many client machines. An illustrative client-side application would include application 1217 as depicted in FIG. 12, which will be described in even greater detail below. According to one embodiment, it is distributed to many work stations, including thousands or even millions of different machines. This will allow each user or even multiple users to input data, which in one embodiment, is received by server-side application 1213.

At a step 1312, user-provided data is received. As will be explained in greater detail below this user-provided data can include origin-destination pairs as well as demographic data as previously mentioned. The user-provided data can be data that defines segments associated with portions of a route. The user-provided data may also be attributes associated with a route, destinations along a route, or even data associated with another person's routing information. In one embodiment, the user-provided data is stored at a step 1314. An illustrative storage location may include data store 1216. Alternatively, this data could be stored in another location that is communicatively coupled to server 1212. Data store 1216 may be a stand-alone device or a component within server 1212.

This system can present a suggested route and depict it on a user interface (which will be described in greater detail below), and at a step 1316 allow users to modify suggested routes. A user can modify a suggested route by indicating a preferred section of a route to travel on, preferred user-defined stops, or other information.

At a step 1318, the user-provided modifications are also stored. Illustratively, these modifications may be stored in data store 1216, making them available for subsequent recommendations to other users with similar requests. Thus, at a step 1320 the user-provided modifications can be utilized to suggest future routes. Also, at a step 1322, the user-provided data and/or modifications can be utilized to increase the overall accuracy of a traffic-prediction model. This can be achieved by using the data to calibrate a traffic-prediction model. In one embodiment, a statistical algorithm can be employed to predict a number of people that might use the route, and more specifically the user-indicated segment. With this guess in place, the actual values provided by users can be used to calibrate and tweak the algorithm employed so that the outcome more closely matches known results. This is somewhat akin to providing additional points along a predicted line and then applying a regression analysis to more accurately develop an equation that models that line. The more points the better. The user-indicated segments provide points. These points, can be used instead of only guessing and also instead of only having real-time traffic data, actual data that users indicate they use or plan on using in the future can be used.

Not necessarily after the aforementioned steps, at a step 1324, demographic data of users and others can be received. We previously mentioned that demographic data could be part of the data that was received at step 1312, which is true. And at step 1324, similar or additional demographic data can be received. We have previously mentioned that illustrative demographic data can include salary income, living-related data, and a variety of other options such as music preferences and any other data that one may think might lead to a correlation between a possession of such attributes and driving patterns.

At a step 1325, this additional user-provided data can be used to further calibrate a traffic-prediction model. For example, if a traffic-prediction model predicts that a user with a certain set of demographic traits may be likely to take a route or a suggested route indication that another user with similar demographic traits takes, then this additional data can be used to confirm or deny that such an anticipated association is accurate.

Figure 14:
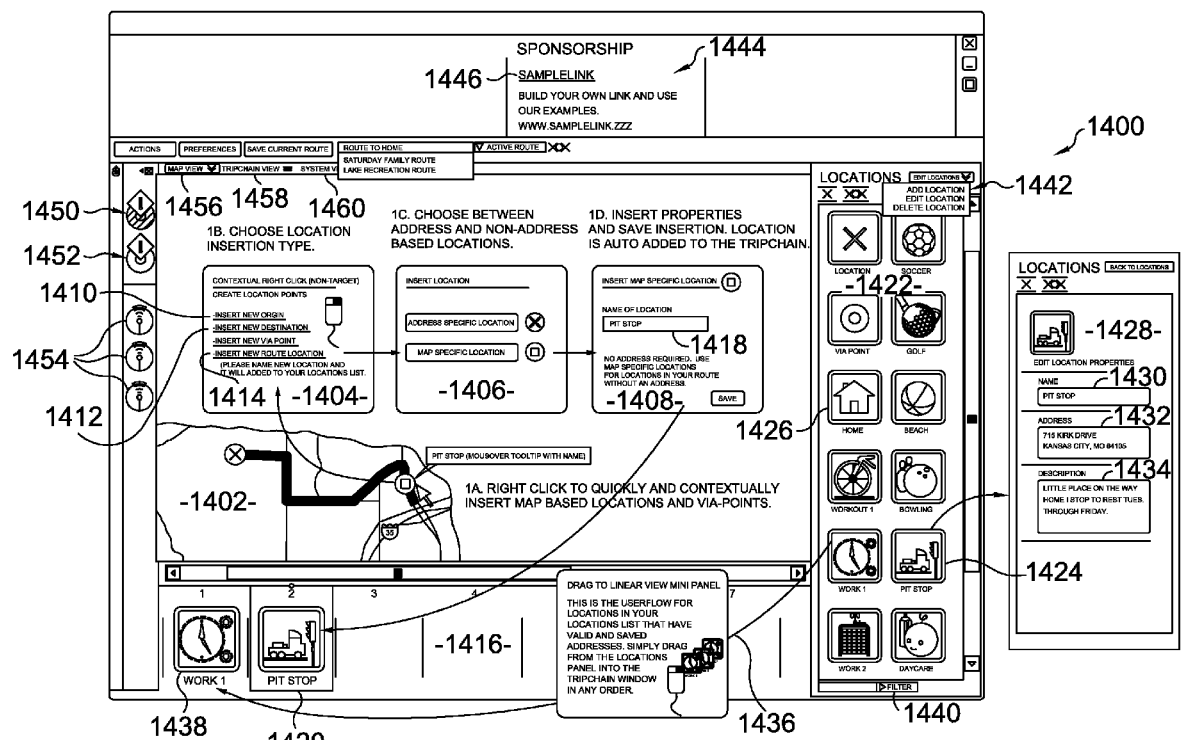
FIG. 14 depicts a graphical user interface and method that facilitates various aspects of embodiments of the present invention including creating routes, depicting warnings, presenting route descriptions, depicting location identifiers, and more.

Turning now to FIG. 14, an illustrative user interface of a screen of client application 1217 is presented and referenced generally by the numeral 1400. Screen 1400 depicts two images including a background and a foreground image. A background image 1402 is depicted by way of a cutaway. A foreground image is made up of three illustrative boxes 1404, 1406, and 1408, which are all shown at the same time to facilitate an explanation of an embodiment of the present invention, but need not be presented simultaneously. Boxes 1404-1408 depict an illustrative process of choosing a location and associating attributes with that location.

Box 1404 includes an insert-new-origin link 1410 that, if followed, allows an individual to insert a new starting point. Link 1412 allows an individual to insert a new destination. Thus, links 1410 and 1412 allow a user to define an origin-destination (OD) pair. Link 1414 allows a user to insert a new via route location. We will explain this later, but a via point is a point that can indicate a temporary stop along a route. As indicated, a user is allowed to name the location that is being defined, at which point it will ultimately be added to what we will refer to herein as a "linear depiction" view in an area referenced by numeral 1416.

Box 1406 allows for users to indicate whether the new location is to be address based or nonaddress based.

Box 1408 provides a control 1418 to receive a user-defined name of the location. As shown, a user has chosen to name the location depicted as "pit stop." The "pit stop" location is shown by an icon or other indicator 1420. If attributes of the location need to be edited, this can be accomplished by double-clicking indicator 1420.

Another way of defining a location is to drag a predefined icon onto linear view 1416 and then associate attributes with it. A set of predefined location indications is depicted in area 1422. Illustrative locations include soccer, via point, golf, home, beach, workout 1, bowling, work 1, work 2, and daycare. After a user-defined location has been defined, it can also be presented in area 1422, as with the case of "pit stop," which is also represented by numeral 1424. As many or as few predefined location indications can be provided to a user. In one embodiment they include location indications that will likely be popular with a variety of users. For instance, a home location indicator 1426 can indicate a user's place of residence.

Attributes associated with the various location indications can be assigned in a variety of ways. For example, pit stop icon 1420 can be double-clicked to expose a user-interface portion or popup window that includes controls to receive description information in one embodiment. In another embodiment the location identifier in area 1422 can also be double-clicked or otherwise engaged, which is shown by window 1428, which is presented incident to double-clicking pit stop identifier 1424. We are mindful that window 1428 includes descriptive information that may be thought of as "attributes," but we intend to associate a more particular meaning with the term. The description information such as the name 1430, the address 1432, and a description 1434 are related to the "pit stop" location, however, when we speak of attributes, as will be explained in greater detail below, we mean to refer to a more feature-rich or intelligent or advanced form of information associated with a location indication. Below, we will describe illustrative attributes associated with a daycare as an example.

As indicated by reference number 1436, an icon in area 1422 can simply be dragged to linear-presentation area 1416 to define a new location. The example shows a work location being defined. After dragging the icon onto linear view 1416, it can be represented by an icon such as the work icon referenced by numeral 1438.

The linear-depiction aspect of an embodiment of the present invention is another novel feature. We will explain this in greater detail when discussing FIG. 15, but summarily linear view 1416 provides a user-friendly and intuitive presentation scheme that allows a user to quickly view in an iconic representation an outline of various stops along a route that they define. This is different than a turn-by-turn recitation or directions. This is not a recitation of directions, but rather a view that graphically depicts location identifiers in an order that a user would encounter while traversing a route of choice.

A filter button 1440 allows the different location identifiers in area 1422 to be filtered based on user-entered criteria.

A drop-down menu 1442 indicates one way that locations can be added to area 1422, and ultimately to map area 1402. As shown, drop-down menu 1442 includes a link to add a location, to edit a location, and to delete a location.

In one embodiment, sponsorship or other advertisement information 1442 can be provided and streamed to client-side application 1217 in one embodiment. A sample link 1446 shows that external pages can be linked to the client application 1217.

Alerts and other indicators such as reminder indicators can also be shown in map area 1402. As shown, a first warning indicator 1450 may be associated with a first warning level. For example, a large traffic jam may be indicated with a high-priority alert, such as the alert indicated by reference number 1450. A lower priority warning indicator 1452 may indicate a warning associated with something of lower priority, such as a general slowdown but not necessarily a backup causing great delays. A set of reminders are indicated by icons identified by reference numeral 1454. These reminders can be associated with locations and graphically depicted on map area 1402 in one embodiment. Reminders will be explained in greater detail in connection with FIG. 15.

Also shown within a menu bar are links to different views. For example, the current view shown in screen area 1400 is map view, which can be presented by clicking on button 1456. The linear-depiction view 1416 can be referenced by clicking an identifier such as the identifier corresponding to the tripchain view 1458. The tripchain view is another name for the linear-depiction view formerly described herein. The system view 1460 may be accessed by clicking on the link partially shown by reference numeral 1460. This view will be discussed in greater detail below, and as another novel aspect of an embodiment of the present invention wherein icons of locations are depicted based on their temporal or geographical proximity to each other.

Figure 15:
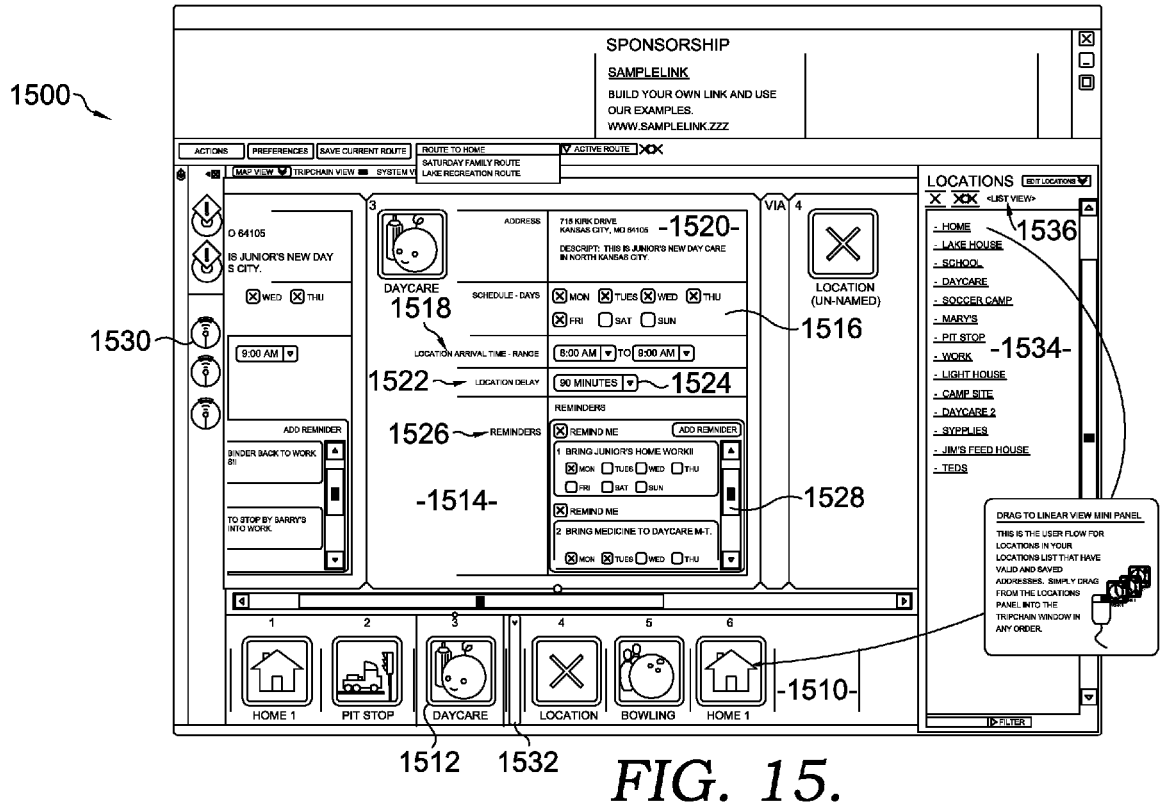
FIG. 15 depicts a graphical user interface that facilitates various aspects of embodiments of the present invention including assigning rich attributes to locations, associating those locations to location identifiers, depicting them in a mini, linear presentation, and more.

Turning now to FIG. 15, an illustrative screen 1500 depicts in greater detail the aspect of an embodiment of the present invention wherein attributes are associated with a defined location identifier. To help facilitate an explanation and understanding of an embodiment of the present invention, an example will be provided with respect to associating the attributes with a daycare location identifier, which is shown in linear view 1510 as icon 1512. A portion of the user interface that presents various options for attribute definition is referenced generally by the numerals 1514. Area 1514 provides illustrative exemplary attributes that might be associated with a location. A first attribute that might be associated with a location includes a schedule such as a schedule of days, which is shown in area 1516. Area 1516 shows that this location may be relevant for only certain days. By way of example, a daycare location may only be relevant for days Monday through Friday, but not the weekends. This is because a child may not be taken to daycare on Saturdays and Sundays. This knowledge can then be used by the system so that more accuracy can be associated with a given traffic model because it knows to not assume that a user will be traveling a certain route associated with traveling to the daycare facility on Saturdays and Sundays.

Another illustrative attribute might be a location arrival time 1518 that might be specific or include a range. As illustratively shown, an arrival time range is depicted as being from 8 a.m. to 9 a.m. This indicates that this user will arrive at the daycare facility at the address indicated in address area 1520 between the hours of 8 a.m. and 9 a.m. The traffic prediction algorithm can further use this information to anticipate and predict travel down to a granular temporal level such as an hour-by-hour basis.

A location-delay indicator 1522 allows a user to input a location delay associated with a given location identifier, which in this example is a daycare location. By way of example, a location delay of 90 minutes is shown in box 1524. A user can customize this. One person's location delay may only be 15 or 20 minutes. But another person may be charged with certain duties at a daycare and may have a long delay such as 90 minutes. But by providing this data, traffic prediction can be made still more accurate because the system knows a timeframe that the user will be commencing the remaining portion of his or her route.

Another illustrative attribute that can be added includes a reminder or set of reminders 1526. Users can completely add whatever reminders they would like. An illustrative reminder is shown as "bring junior's homework." This reminder is illustratively shown to be triggered on Mondays. Several reminders are shown as indicated by the position of slider 1528. A second illustrative reminder includes "bring medicine to daycare M-T." This reminder indicates that the user is to bring medicine for the child to daycare on Mondays and Tuesdays. In one embodiment a reminder icon such as icon 1530 (or 1454 as shown in FIG. 14) can be depicted on a map in connection with this location. An example of this is shown on FIG. 16 and indicated by reference numeral 1610.

Returning to FIG. 15, a via point 1532 is also shown in the linear view 1510. One novel feature, among many, of linear view 1510 is its miniature or abrogated display. It is useful, conserves resources, and is expedient for a user to be able to view a number of location indications simultaneously. For example, as shown in FIG. 15, six location identifiers are depicted in area 1510.

Another area shown in screenshot 1500 is the list view 1534, accessible in one embodiment by a list-view link 1536. List-view area 1534 depicts various location indicators in the form of hyperlinks that, if followed, can present location descriptions such as those shown in area 1428 of FIG. 14, or location attributes as shown in area 1514.

Figure 16:
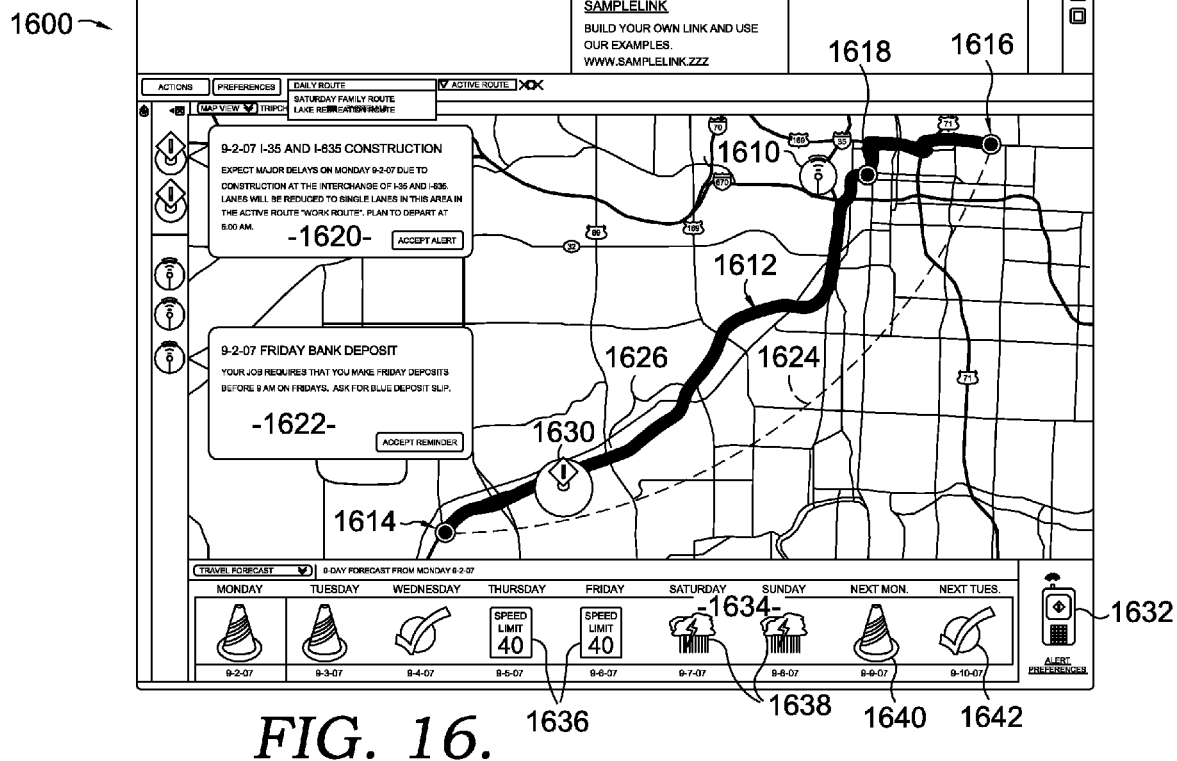
FIG. 16 depicts a graphical user interface that facilitates various aspects of embodiments of the present invention including presenting routes, custom defining segments of a desired route, presenting traffic-pattern forecasts, redrawing a route based on user input, depicting warnings, depicting alerts, depicting a link to customize alter preferences, exposing options to accept alerts and reminders, and more.

Turning now to FIG. 16, an illustrative screenshot 1600 depicts a route 1612 that includes an origin 1614 and a destination 1616 as well as a via point 1618. As mentioned, a via point is a point or stop that the user indicates is to be traveled through from an origin to a destination. Screenshot 1600 shows that alerts and reminders can also be associated with a route such as route 1612. Box 1620 indicates an illustrative alert that indicates that delays are due to be expected on a certain day based on certain construction. Box 1622 indicates a reminder, which, as shown, is reminding a person to pick up a deposit slip. This reminder is also correlated with route 1612 by way of route-reminder indicator 1610. The route shown 1612 may not have been the original route shown. For example another route, indicated by dashed line 1624, may have been a route originally suggested by the system based on origin 1614 and destination 1616. But a user may have indicated that a desired segment, such as segment 1626, be included in a route from origin 1614 to destination 1616. In accordance with an embodiment of the invention, this segment 1626, which may not have even been a defined segment prior to allowing a user to define the segment, could have been the impetus that gave rise to modified path 1612. That is, a user may have originally entered origin 1614 and destination 1616 and been presented with suggested route 1624. But after the invention receives user-defined segment 1626, a new route, namely route 1612, is suggested to the user. Moreover, 1626 becomes a new available segment on which to base future routes.

As mentioned, alerts such as alert identifier 1630 can be depicted on a map. But other forms of alerts can also be provided. For example, an alert can be configured to be sent to a user by way of his or her mobile phone or some other device such as a PDA or a computer. Although not shown so as to not obscure the present invention, such preferences can be accessed by clicking on a link or icon such as that represented by reference number 1632. Embodiments of the invention take alert notification to another level. For example, rather than merely indicating an alert that is unintelligent and merely a regurgitation of real-time traffic data, embodiments of the present invention consider real-time traffic data in connection with attributes that users have defined in connection with location indications to intelligently update users when real world, and often unplanned, situations may give rise to events that interfere with a user's schedule. For example, consider the example of FIG. 15 where a daycare location has been associated with attributes that indicate an arrival time of 8 a.m. to 9 a.m. and a location delay of 90 minutes. In one embodiment, if a traffic jam occurs on a user's route that is associated with a daycare facility and it is determined that the traffic jam is of such a nature that it will prolong or postpone the user's arrival time to be beyond the predefined window of 8 a.m. to 9 a.m., then an alert can be sent to the user informing the user that that user will not make the predefined window. Accordingly a person who does not have time to watch the news or does not make time or prefers to listen to traffic updates on the radio may still receive an alert, but not a bombardment of all alerts, but only those alerts that are relevant to him or her based on attributes associated with various location identifiers. In this way, alerts are sent sometimes based on real-time traffic conditions but are done so in light of a user's saved routes or routing information. These alerts can be based on future conditions again in light of a user's saved routes. One advantage that this offers as a practical application in a technological art is that server application 1213 can facilitate the communication of an alternative route based on the hazard. Thus not only can a user be updated as to the presence of a hazard or some other alert indication, they can be presented with options for an alternative route. In some embodiments, a user can be prompted to accept or reject this new route. Receiving feedback associated with the alternative route becomes relevant when contemplating the collaborative or social-network aspects of the present invention, which will be described later in detail below.

Also shown in screenshot 1600 is a forecasting area 1634 that presents identifiers associated with forecasted traffic conditions based on days of the week. As shown, Thursday and Friday have indicators 1636 that indicate a speed limit of 40 miles per hour will be applicable. Other identifiers 1638 indicate that Saturday and Sunday will likely be busy days or hazardous travel due to weather. Construction may be indicated by a cone such as that of indicated by reference number 1640. Alternatively unobstructed travel may be indicated by the identifier referenced by numeral 1642.

Figure 17:
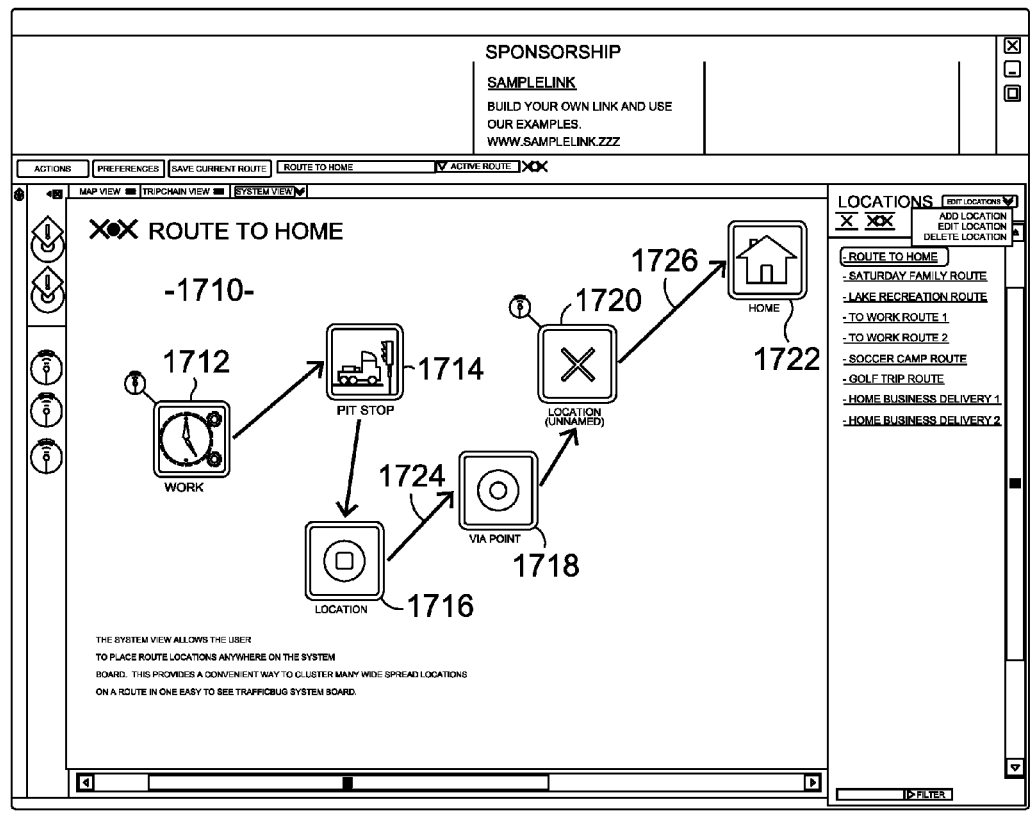
FIG. 17 depicts a graphical user interface that facilitates various aspects of embodiments of the present invention including presenting location indications (a.k.a "identifiers") in relation to each other in a way that corresponds to their real-world temporal or geographic proximity to each other.

FIG. 17 depicts another novel aspect of the invention depicted by way of a screenshot 1700 in which various location identifiers are graphically depicted based on either temporal or geographical proximity to each other. In an alternative embodiment, the spacing of items can be user defined. In the system-view area 1710, five location identifiers are shown: a work identifier 1712, a pit stop identifier 1714, a waypoint identifier 1716, a via point identifier 1718, an unnamed location identifier 1720, and finally a home identifier 1722. Some of the locations that correspond to the location identifiers are closer to each other than others. Closer can mean closer in time or closer in distance. Those locations that are closer to each other than others will have identifiers that correspond to those locations graphically depicted closer to each other than to others in a similar fashion. For example, waypoint 1716 is closer to via point 1718 than the unnamed location 1720 is to the home location indicated by numeral 1722. Thus, waypoint identifier 1716 is shown closer to via point 1718 than unnamed location identifier 1720 is to home identifier 1722. Summarily, arrow 1724 is shorter than arrow 1726. This allows a user to quickly ascertain differences in geography and time between various locations in the real world.

An illustrative method for depicting the views seen in area 1710 is to utilize the descriptive information associated with each location indication and then benchmark that against known GIS location data (such as that stored in reservoir 1228 of FIG. 12) that includes descriptive information including geographical information so that a geographic distance between the various points along a given route can be determined. That information can then be used to create a scale by which the different location indications should be depicted relative to one another. This scale may vary.

Another illustrative aspect previously briefly alluded to includes a social-networking or collaborative aspect. Some of the novel features associated with this aspect includes the ability for users to have their maps or routing information updated based on data received from third parties. In another embodiment, an event can be subscribed to by multiple people, such that an updating of that event updates everyone's presentation, be it on a PDA, mobile phone, computer, etc. Examples help illustrate the functionality offered by the present invention.

Consider an example where several parents have children that play on a common soccer team. One person may enter the location of the soccer field. By granting access to that information, other users can have that information reflected in their presentation. Then, if a traffic jam occurs in a vicinity nearby the soccer fields, each person may receive an alert based on that incident. Moreover, if one parent gets word that the game has been relocated to a different facility, he or she can update the location of the soccer field, and by virtue of linking user accounts or access to such information, everyone's maps will automatically be updated with new routing information.

Similarly, a group of people may wish to dine at a specific restaurant. One person can enter the location of the restaurant, and other people can receive an indication of the address. But if the address location changes, then everyone will have his or her map updated automatically. Still further, if an accident or hazard occurs such that one person will be late, and that person has associated attributes with the restaurant event, the system will be able to determine that that person is going to be late to the eating engagement, and automatically send alerts to the remaining members without any interaction from the person who will be delayed.

In this way, the present invention offers an ability to receive user input from a single person and have that input automatically conveyed to multiple parties. Moreover embodiments of the present invention allow for the automatic updating of every person's depiction who are in a group based on a change to an attribute associated with an event. Moreover, other people's information can be made accessible to members of the group.

For example, consider the daycare scenario again. If a hazard situation occurs, and a new route is suggested to the mother of a child who may be on her way to pick up the children, then the father of the children or any other interested person who has been granted permission can receive an indication of the change in routes. Then, if something happens whereby the mother did not reach the destination even in a newly allotted window, the father would know to look for her along a different route instead of her usual route.

In another example, assume someone's parents are visiting their children from out of town. Perhaps they need to receive routing information from the airport to the child's home. Whereas the system may provide a suggested route perhaps based only on time or geographic location, in an embodiment of the present invention, the system could offer a route to the parents that was customized by the children who are familiar with the area. If the children grant access to the parents, or trust their data such that no restrictions are placed on access to their data, then the parents could request of the system routing information associated with the children and their origin-destination pairs to receive what at least the children perceive to be a better route.

Alternative embodiments and implementations of the present invention will become apparent to those skilled in the art to which it pertains upon review of the specification, including the drawing figures. Accordingly, the scope of the present invention is defined by the claims that appear in the "claims" section of this document, rather than the foregoing description. As mentioned, embodiments of the present invention include a variety of features. Below is a partial listing of some of those embodiments and features:

1. One or more computer-readable media having computer-useable instructions embodied thereon for performing a method of forecasting traffic patterns, the method comprising: exposing a user interface to a user that includes a set of fields that receive user-entered data that describes an origin and a destination for which a route can be provided; receiving the user-entered data; utilizing the user-entered data to increase an accuracy of a traffic-prediction model.

2. The media of feature 1, wherein the exposing includes providing a client-based software application that runs locally on a user machine.

3. The media of feature 1, wherein the exposing includes providing a network-based application that is made accessible locally but runs on a remote computing device.

4. The media of feature 1, wherein the utilizing includes incorporating the data into a traffic-prediction algorithm.

5. The media of feature 1, wherein the utilizing includes storing the user-entered data in a database that is remote from the user and that is accessible independent of a user's machine.

6. The media of feature 1, further comprising exposing a set of fields that receive demographic data associated with the user, and correlating the demographic data with historical traffic data associated with others having similar demographic data.

7. The media of feature 6, wherein the demographic data includes socio-economic data including a selecting from one or more of: a individual income, a household income, a net worth, a residence valuation, an amount of debt owed, a mortgage amount, a type of automobile, and an indication of a number of dependents.

8. The media of feature 7, further comprising predicting traffic patterns of other persons having certain demographic traits based on gleaned traffic patterns of a user associated with certain demographic data.

9. The media of feature 8, wherein the certain demographic traits are shared by a user, and wherein the certain demographic traits are dissimilar to those associated with the user.

10. The media of feature 9, further comprising receiving one or more of: preferred-route day; time/date travel information; and reasons for a trip from the fields.

11. The media of feature 1, further comprising providing one or more location based services to a user based on the user-entered data.

12. The media of feature 11, where one or more of the location based services include presenting coupons associated with entities along a route determined by the user-entered data.

13. A system for forecasting traffic patterns, the system comprising,
a client component that receives indications of origins and destinations associated with a trip; a server component in communication the client application that receives and facilities the storing of the origins and destinations; and a traffic-prediction component that utilizes the origins and destinations to forecast traffic based on the origins and destinations.

14. One or more computer-readable media having computer-useable instructions embodied thereon for performing a method of forecasting traffic patterns by including user-defined trip patterns, the method comprising: presenting a graphical user interface to a user that presents a suggested route based on received origin and destination data; allowing a user to customize at least one segment of the route by receiving customization data, which includes data that indicates the at least one segment; utilizing the customization data to define a new segment; storing segment information that describes the new segment; and utilizing the segment information to subsequently suggest new routes that include the new segment.

15. The media of feature 14, wherein the presenting the graphical user interface includes presenting the graphical user interface by way of a local application running on a machine local to the user.

16. The media of feature 15, wherein the origin and destination data is received by the user.

17. The media of feature 14, wherein the customization data includes a definition of a new origin and destination.

18. The media of feature 14, wherein the utilizing the customization data to define a new segment includes referencing a data store that stores the customization data to define the new segment.

19. The media of feature 14, wherein utilizing the segment information to subsequently suggest new routes includes contemplating the new segment when determining what route to propose to the user.

20. One or more computer-readable media having computer-useable instructions embodied thereon for performing a method of forecasting traffic patterns by including user-defined trip patterns, the method comprising: receiving by way of a distributed client application segment information from a user that defines a traffic-route segment; utilizing the segment information to store segment data that is useable to subsequently suggest traffic routes; and incident to receiving a subsequent request for a traffic-route suggestion that would otherwise not have included the traffic-route segment but for receiving the segment information from the user, presenting an actual traffic-route suggestion that includes the traffic-route segment.

21. The media of feature 20, wherein the segment information defines a portion of a traffic route.

22. The media of feature 20, wherein the distributed client application runs on a consumer electronics device, including at least one of a PDA and a computer.

23. The media of feature 20, wherein presenting the actual traffic-route suggestion includes presenting the suggestion to one or more users.

24. The media of feature 23, wherein presenting the suggestion to one or more users includes determining a relationship between the one or more users, and based on the relationship, presenting the suggestion.

25. One or more computer-readable media having computer-useable instructions embodied thereon for performing a method of forecasting traffic patterns by including user-defined trip patterns, the method comprising: presenting a graphical user interface to a user that includes one or more controls configured to receive segment-defining data that describes a user-defined travel-route segment ("segment") that did not previously exist in a data store that stores travel-routing information, the data store being communicatively coupled to the graphical user interface; storing the segment-defining data in the data store; and utilizing the stored segment-defining data to recommend a traffic route that includes the stored segment-defining data that would not have been recommended but for the storage of the segment-defining data.

26. The media of feature 25, wherein the data store is communicatively coupled to the graphical user interface by way of a wired technology.

27. The media of feature 25, wherein the data store is communicatively coupled to the graphical user interface by way of a wireless technology.

28. The media of feature 27, wherein the wireless technology includes a short-range wireless technology or a long-range wireless technology.

29. The media of feature 25, wherein utilizing the stored segment-defining data to recommend a traffic route includes considering the stored segment-defining data in an algorithm that is used to derive the traffic route.

30. One or more computer-readable media having computer-useable instructions embodied thereon that, when processed by one or more computing devices, facilitate a method comprising: presenting a graphical user interface for defining one or more locations associated with a traffic route; presenting a set of controls to receive attributes to be associated with the one or more locations; receiving the attributes to be associated with the one or more locations; associating the attributes with the one or more locations; storing the attributes associated with the one or more locations.

31. The media of feature 30, wherein presenting the graphical user interface includes utilizing a local application to present the graphical user interface.

32. The media of feature 30, wherein the set of controls includes one or more of: a text box; a drop-down menu; a radio button; and an add-in.

33. The media of feature 30, wherein the attributes include one or more of: a trip-start time; a destination-arrival time; a destination duration that indicates an estimated amount of time that one is to remain at the one or more locations; an alarm; a reminder; a placement indication within a set of locations; and a schedule that indicates a visitation time or set of times associated with the one or more locations.

34. The media of feature 33, wherein at least a portion of the attributes are user entered.

35. The media of feature 30, wherein associating the attributes includes linking the attributes in at least one user profile to the one or more locations.

36. One or more computer-readable media having computer-useable instructions embodied thereon that, when processed by one or more computing devices, facilitate a method comprising: providing origin-destination information to be utilized to determine a traffic-planning route; defining a location indication that indicates a real-world location associated with the traffic-planning route; receiving user-entered attribute information to be associated with the real-world location; associating the user-entered attribute information with the location, wherein the user-entered attribute information includes user-specific information that varies with users.

37. The media of feature 30, wherein the user-entered attributes include one or more of: a trip-start time; a destination-arrival time; a destination duration that indicates an estimated amount of time that one is to remain at the one or more locations; an alarm; a reminder; a placement indication within a set of locations; and a schedule that indicates a visitation time or set of times associated with the one or more locations.

38. One or more computer-readable media having computer-useable instructions embodied thereon for performing a method of communicating traffic-situation-generated alerts based on user information, the method comprising: receiving from a user attribute information that is associated with a location of interest that is associated with a traffic route of interest; receiving traffic-related data that is relevant to the traffic route of interest based on the attribute information; based on the traffic-related data, communicating an alert message to the user if the traffic-related data indicates that driving conditions will affect traversing the route in a manner that is inconsistent with the attributes.

39. The media of feature 38, wherein the attribute information includes one or more of: a trip-start time; a destination-arrival time; a destination duration that indicates an estimated amount of time that one is to remain at the one or more locations; an alarm; a reminder; a placement indication within a set of locations; and a schedule that indicates a visitation time or set of times associated with the one or more locations.

40. The media of feature 38, wherein the traffic-related data includes one or both of: real-time traffic data; data relating to planned traffic activities.

41. The media of feature 38, wherein the traffic-related data is relevant to the traffic route of interest if it is associated with conditions associated with the route of interest.

42. The media of feature 41, wherein the traffic-related data includes one or more of: construction associated with the route of interest; a level of busyness associated with the route of interest; accident data associated with the route of interest; a new segment associated with the route of interest; and a detour associated with the route of interest.

43. The media of feature 38, wherein the driving conditions relate to one or more of: a busyness of the route; and a busyness of an alternative route.

44. One or more computer-readable media having computer-useable instructions embodied thereon for performing a method of communicating traffic-situation-generated alerts based on user information, the method comprising: receiving attribute information from a user, the attribute information being associated with a traffic-related item of interest; storing the attribute information in a data store; automatically determining that one or more traffic-related incidents will affect traveling related to the traffic-related item of interest; and automatically communicating a message to the user based on the one or more traffic-related incidents.

45. The media of feature 44, wherein the automatically determining occurs in real time.

46. The media of feature 44, wherein the automatically determining occurs as a result of analyzing origin/destination (OD) data pairs.

47. The media of feature 44, wherein automatically communicating a message includes automatically communicating one or more of: a text message; a voice mail; and an email.

48. One or more computer-readable media having computer-useable instructions embodied thereon for performing a method of communicating traffic-situation-generated alerts based on user information, the method comprising: determining from a set of traffic-related data values a traffic-related condition that could interfere with a travel scenario of a user; inspecting a set of attributes associated with an aspect of the travel scenario, the attributes having been previously provided by the user; determining that the traffic-related data values will interfere with the travel scenario based on the set of attributes; automatically communicating to the user a message that was prompted by the traffic-related condition, and its potential impact on the travel-related scenario in light of the set of attributes.

49. The media of feature 48, wherein the traffic-related condition includes an anticipated traffic-related condition.

50. The media of feature 49, wherein the anticipated traffic-related condition is determined from data received by a plurality of users.

51. One or more computer-readable media having computer-useable instructions embodied thereon that, when processed by one or more computing devices, facilitate a method comprising: receiving a first set of attribute information from a first user that defines a first set of attributes associated with a first location that is a associated with a first planned traffic route; receiving an indication from a second user that indicates a desire to be updated with change information that is associated with the first location; receiving traffic-related information that affects a traffic-related scenario that involves the first location; automatically communicating a status message to the second user incident to receiving the traffic-related information that affected the traffic-related scenario that involved the first location.

52. The media of feature 51, wherein the first set of attribute information includes one or more of: a trip-start time; a destination-arrival time; a destination duration that indicates an estimated amount of time that one is to remain at the one or more locations; an alarm; a reminder; a placement indication within a set of locations; and a schedule that indicates a visitation time or set of times associated with the one or more locations.

53. The media of feature 51, wherein the traffic-related information includes one or more of: construction associated with the route of interest; a level of busyness associated with the route of interest; accident data associated with the route of interest; a new segment associated with the route of interest; and a detour associated with the route of interest.

54. The media of feature 51, wherein automatically communicating a message includes automatically communicating one or more of: a text message; a voice mail; and an email.

55. The media of feature 51, wherein automatically communicating a status message to the second user includes providing an option to receive feedback from the second user.

56. The media of feature 52, the option to receive feedback from the second user includes an option to update the attributes associated with a first location.

57. One or more computer-readable media having computer-useable instructions embodied thereon that, when processed by one or more computing devices, facilitate a method comprising: receiving a first location indication that identifies a first location that a first user is interested in; receiving a first set of logistical attributes from the user that define aspects of the first location; receiving permission-grant information that grants permission to share all or a portion of the first set of logistical attributes with other users; presenting to the other users corresponding location indications that correspond to the first location; receiving change information that describes changes relevant to traffic-related information associated with the first location; and automatically updating the first location indication as well as the corresponding location indications.

58. The media of feature 57, wherein the first location includes a route associated with an origin and a destination.

59. The media of feature 57, wherein the traffic-related information includes one or more of: construction associated with the route of interest; a level of busyness associated with the route of interest; accident data associated with the route of interest; a new segment associated with the route of interest; and a detour associated with the route of interest.

60. One or more computer-readable media having computer-useable instructions embodied thereon that, when processed by one or more computing devices, facilitate a method comprising: receiving from a first user a first set of routing information that defines a first routing scenario of interest to the first user; utilizing the first set of routing information to present a routing indication on a display associated with a second user, wherein the routing indication is based on the first set of routing information received from the first user; receiving change data that potentially impacts travel plans associated with the first routing scenario respectively based on, (1) profile information associated with the first user, and (2) profile information associated with the second user; and automatically updating presentations respectively associated with the first and with the second users.

61. One or more computer-readable media have computer-useable instructions embodied thereon for performing a method, the method comprising: presenting a set of preconfigured icons that are to be associated with a predetermined set of locations; enabling a user to drag and drop at least one of the preconfigured icons onto a mapping area; presenting in a linear fashion a set of location indications that respectively correspond to the preconfigured icons.

62. The media of feature 61 wherein the mapping includes a map or a reserved portion of a user interface.

63. One or more computer-readable media have computer-useable instructions embodied thereon for performing a method, the method comprising: presenting a set of controls that are useable to define locations that are represented and depicted by location indications; receiving by way of the controls, location-description information that defines a set of location; presetting the location indications in a linear form based on the location-description information, and in order of encounter based on a user-requested route.

64. One or more computer-readable media have computer-useable instructions embodied thereon for presenting a graphical user interface (GUI), the GUI comprising: a first area that presents a set of travel-location icons that are useable to define locations of interest; a trip-depiction area that presents in linear form a plurality of the travel-location icons according to an order of encountering physical locations that correspond to the travel-location icons based on a user-provided route.

65. One or more computer-readable media have computer-useable instructions embodied thereon for presenting a graphical user interface (GUI), the GUI comprising a plurality of location indications that correspond to real-world locations, the plural of locating indications being presented in probity to each other based on their real-world proximity to each other.

66. The media of feature 65, wherein the real-world proximity includes a distance measurement or a temporal measurement.

67. One or more computer-readable media have computer-useable instructions embodied thereon for presenting a graphical user interface (GUI), the GUI comprising:

a plurality of location icons that each respectively correspond to physical geographic locations; the plurality of location icons being presented in such a way that their physical distance from each other is in a proportion to a physical proximate relationship that exists between the physical geographic locations.

68. One or more computer-readable media having computer-useable instructions embodied thereon for performing a method of forecasting traffic patterns, the method comprising: a) receiving from a user an indication of a trip origin (origin); b) receiving from the user an indication of a trip destination (destination); c) storing the origin and the destination in a database that is remote from the remote device; completing the steps a-c for additional origins and destinations from the user or from additional users to produce an aggregated set of origin-destination pairs; and predicting future traffic patterns based, at least in part, on the aggregated set of origin-destination pairs.

The claims follow.

The invention claimed is:

1. One or more computer-readable media having computer-useable instructions embodied thereon for performing a method of forecasting traffic patterns, the method comprising:
   exposing a user interface to a user that includes a set of fields that receive user-entered data that describes an origin and a destination for which a route can be provided;
   receiving the user-entered data;
   utilizing the user-entered data to increase an accuracy of a traffic-prediction model.

2. The media of claim 1, wherein the exposing includes providing a client-based software application that runs locally on a user machine.

3. The media of claim 1, wherein the exposing includes providing a network-based application that is made accessible locally but runs on a remote computing device.

4. The media of claim 1, wherein the utilizing includes incorporating the data into a traffic-prediction algorithm.

5. The media of claim 1, wherein the utilizing includes storing the user-entered data in a database that is remote from the user and that is accessible independent of a user's machine.

6. The media of claim 1, further comprising exposing a set of fields that receive demographic data associated with the user, and correlating the demographic data with historical traffic data associated with others having similar demographic data.

7. One or more computer-readable media having computer-useable instructions embodied thereon for performing a method of forecasting traffic patterns, the method comprising:
   exposing a user interface to a user that includes a set of fields that receive user-entered data that describes an origin and a destination for which a route can be provided;
   receiving the user-entered data;
   exposing a set of fields that receive demographic data associated with the user, and correlating the demographic data with historical traffic data associated with others having similar demographic data, wherein the demographic data includes socio-economic data including a selecting from one or more of: a individual income, a household income, a net worth, a residence valuation, an amount of debt owed, a mortgage amount, a type of automobile, and an indication of a number of dependents; and
   utilizing the user-entered data to increase an accuracy of a traffic-prediction model.

8. The media of claim 7, further comprising predicting traffic patterns of other persons having certain demographic traits based on gleaned traffic patterns of a user associated with certain demographic data.

9. The media of claim 8, wherein the certain demographic traits are shared by the user, or wherein the certain demographic traits are not in common with the user.

10. The media of claim 9, further comprising receiving one or more of:
    preferred-route day;
    time/date travel information; and
    reasons for a trip from the fields.

11. The media of claim 1, further comprising providing one or more location based services to a user based on the user-entered data.

12. The media of claim 11, where one or more of the location based services include presenting coupons associated with entities along a route determined by the user-entered data.

13. A system for forecasting traffic patterns, the system comprising,
    a client component that receives indications of origins and destinations associated with a trip;
    a server component in communication the client application that receives and facilities the storing of the origins and destinations; and
    a traffic-prediction component that utilizes the origins and destinations to to increase an accuracy of a traffic-prediction model.

14. One or more computer-readable media having computer-useable instructions embodied thereon for performing a method of forecasting traffic patterns by including user-defined trip patterns, the method comprising:
    presenting a graphical user interface to a user that presents a suggested route based on received origin and destination data;
    allowing a user to customize at least one segment of the route by receiving customization data, which includes data that indicates the at least one segment;
    utilizing the customization data to define a new segment;
    storing segment information that describes the new segment; and
    utilizing the segment information to subsequently suggest new routes that include the new segment.

15. The media of claim 14, wherein the presenting the graphical user interface includes presenting the graphical user interface by way of a local application running on a machine local to the user.

16. The media of claim 15, wherein the origin and destination data is received by the user.

17. The media of claim 14, wherein the customization data includes a definition of a new origin and destination.

18. The media of claim 14, wherein the utilizing the customization data to define a new segment includes referencing a data store that stores the customization data to define the new segment.

19. The media of claim 14, wherein utilizing the segment information to subsequently suggest new routes includes contemplating the new segment when determining what route to propose to the user.

* * * * *